(12) United States Patent
Akasaka et al.

(10) Patent No.: US 10,258,999 B2
(45) Date of Patent: Apr. 16, 2019

(54) SEPARATOR

(71) Applicant: Panasonic Intellectual Property Management Co., Ltd., Osaka (JP)

(72) Inventors: Osamu Akasaka, Hyogo (JP); Yoshiki Hayasaki, Osaka (JP); Koji Tsuji, Osaka (JP); Hirotaka Matsunami, Osaka (JP); Masanao Kamakura, Osaka (JP); Yoshikazu Kuzuoka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 137 days.

(21) Appl. No.: 15/504,177

(22) PCT Filed: Dec. 9, 2015

(86) PCT No.: PCT/JP2015/006150
§ 371 (c)(1),
(2) Date: Feb. 15, 2017

(87) PCT Pub. No.: WO2016/092847
PCT Pub. Date: Jun. 16, 2016

(65) Prior Publication Data
US 2017/0274391 A1 Sep. 28, 2017

(30) Foreign Application Priority Data
Dec. 10, 2014 (JP) .................................. 2014-250108

(51) Int. Cl.
*B04B 5/12* (2006.01)
*B01D 45/14* (2006.01)
(Continued)

(52) U.S. Cl.
CPC ................ *B04B 5/12* (2013.01); *B01D 45/12* (2013.01); *B01D 45/14* (2013.01); *B01D 50/002* (2013.01);
(Continued)

(58) Field of Classification Search
CPC ...... B01D 21/20; B01D 17/038; B01D 21/26; B01D 45/16; F02M 35/022; F02M 35/02
(Continued)

(56) References Cited

U.S. PATENT DOCUMENTS 5,149,345 A 9/1992 Bouchard et al.
5,466,384 A * 11/1995 Prevost ............. B01D 17/0217
210/787

(Continued)

FOREIGN PATENT DOCUMENTS

JP 55-094615 A 7/1980
JP 58-46700 U 3/1983
(Continued)

OTHER PUBLICATIONS

International Search Report for corresponding International Application No. PCT/JP2015/006150 dated Mar. 8, 2016.
(Continued)

*Primary Examiner* — Duane Smith
*Assistant Examiner* — Minh Chau T Pham
(74) *Attorney, Agent, or Firm* — Renner Otto Boisselle & Sklar, LLP

(57) ABSTRACT

A separator includes a rotor, a plurality of flow channels each of which has an inlet and an outlet for gas and are in a vicinity of a rotation axis of the rotor, an air current producer configured to cause gas to flow through the plurality of flow channels, a

(51) Int. Cl.
*B01D 45/12* (2006.01)
*B04C 3/00* (2006.01)
*B04C 9/00* (2006.01)
*B01D 50/00* (2006.01)

(52) U.S. Cl.
CPC ............... *B04C 3/00* (2013.01); *B04C 9/00* (2013.01); *B04B 2005/125* (2013.01); *B04C 2009/007* (2013.01)

(58) Field of Classification Search
USPC ....... 55/456, 459.1; 209/715, 716, 725, 734; 210/787, 512.3, 413, 414, 415, 788, 800, 210/806, 538, 539
See application file for complete search history.

(56) References Cited

U.S. PATENT DOCUMENTS

| | | | |
|---|---|---|---|
| 6,363,923 | B1 | 4/2002 | Pletschacher |
| 6,379,567 | B1* | 4/2002 | Crites ............... B01D 17/0205 210/788 |
| 2014/0090563 | A1 | 4/2014 | Robertson et al. |
| 2016/0047342 | A1* | 2/2016 | Kraxner ............... B01D 45/16 55/442 |

FOREIGN PATENT DOCUMENTS

| | | |
|---|---|---|
| JP | 58-502136 A | 12/1983 |
| JP | 63-205165 A | 8/1988 |
| JP | 01-151820 U | 10/1989 |
| JP | 2000-140705 A | 5/2000 |
| JP | 2001-087610 A | 4/2001 |
| JP | 2002-526233 A | 8/2002 |
| JP | 2002-528670 A | 9/2002 |
| JP | 2014-069087 A | 4/2014 |
| JP | 2014-198328 A | 10/2014 |
| WO | WO 83/02072 A1 | 6/1983 |
| WO | WO 00/19881 A1 | 4/2000 |

OTHER PUBLICATIONS

Form PCT/ISA/237 for corresponding International Application No. PCT/JP2015/006150 dated Mar. 8, 2016.
Edited by Kamei Saburou, "Kagakukikai non riron to keisan (Second Edition), p. 483", Sangyotosho, 1975 with partial English translation (cited in the specification).

* cited by examiner

SEPARATOR

TECHNICAL FIELD

The present invention relates to separators and, more particularly, to a separator for separating solid materials from gas.

BACKGROUND ART

There have been known separators which employ a technique for separating solid materials from a fluid with the centrifugal force acted thereon while swirling the fluid (see JP 2014-198328 A, hereinafter referred to as Document 1, and JP 2014-069087 A, hereinafter referred to as Document 2).

Document 1 describes a cyclone type dust collecting device and an air purifying apparatus using the same.

The air purifying apparatus includes, in the inside of a body, the dust collecting device, an air filter, a deodorant filter, and a blowing means.

The dust collecting device includes a vortex generation unit, a dust collecting chamber, and a connection part connecting the vortex generation unit and the dust collecting chamber.

Document 2 describes a cyclone type separator.

In a field of the separator, it has been desired to develop a separator capable of efficiently separating solid materials from gas with a compact size.

DISCLOSURE OF THE INVENTION

An objective of the present invention is to provide a separator capable of efficiently separating solid materials from gas with a compact size.

A separator according to an aspect of the present invention includes: a rotor; a plurality of flow channels each of which has an inlet and an outlet for gas and are in a vicinity of a rotation axis of the rotor; and an air current producer configured to cause gas to flow through the plurality of flow channels, and further includes: a driving device configured to rotate the rotor to rotate the plurality of flow channels around the rotation axis; and a discharger for allowing discharge of solid materials suspended in airstream produced in each of the plurality of flow channels, in a direction away from the rotation axis.

DESCRIPTION OF EMBODIMENTS

Figures mentioned in the following explanation of Embodiments 1 to 3 are schematic, and therefore ratios of sizes or thickness of illustrated components may not always reflect actual ratios of dimensions.

Embodiment 1

Hereinafter, a separator 1a according to the present embodiment is described with reference to FIGS. 1 to 11.

Figure 1:
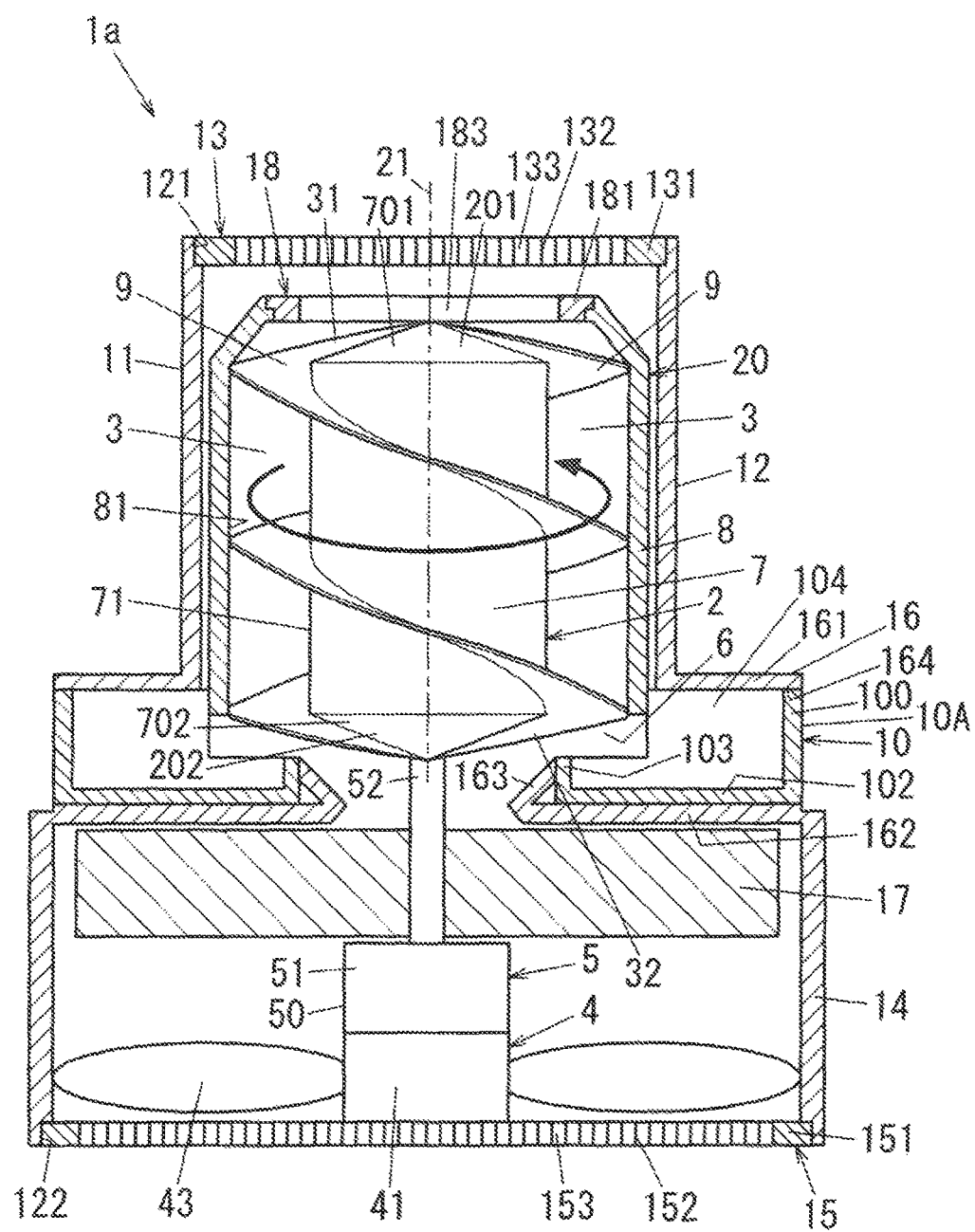
FIG. 1 is a schematic configuration diagram of a separator according to Embodiment 1.
Figure 2:
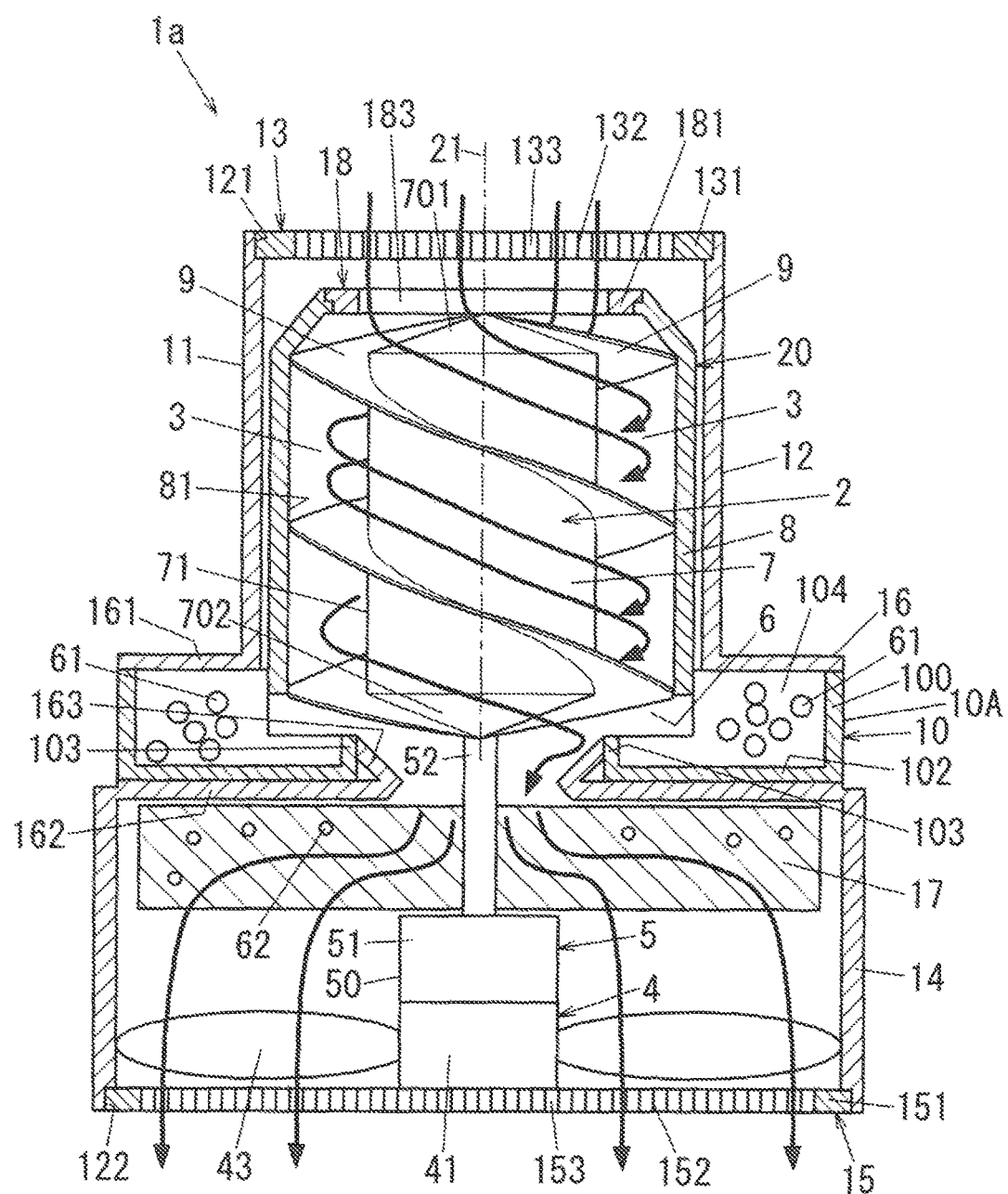
FIG. 2 is a diagram for illustrating an operation of the separator according to Embodiment 1.

The separator 1a includes a rotor 2, flow channels 3, an air current producer 4, a driving device 5, and a discharger 6. Each of the flow channels 3 has an inlet 31 and an outlet 32 for gas. The flow channels 3 are in the vicinity (around) a rotation axis 21 of the rotor 2. The air current producer 4 is configured to cause gas to flow through the flow channels 3. The driving device 5 is configured to rotate the rotor 2 to rotate the flow channels 3 around the rotation axis 21. The discharger 6 allows discharge of solid materials suspended in airstream produced in each of the flow channels 3, in a direction away from the rotation axis 21. Namely, the separator 1a includes: the rotor 2; the flow channels 3 each of which has the inlet 31 and the outlet 32 for gas and are in the vicinity of (around) the rotation axis 21 of the rotor 2; and the air current producer 4 configured to cause gas to flow through the flow channels 3, and further includes: the driving device 5 configured to rotate the rotor 2 to rotate the flow channels 3 around the rotation axis 21; and the discharger 6 for allowing discharge of the solid materials suspended in the airstream produced in each of the flow channels 3, in a direction away from the rotation axis 21. Accordingly, the separator 1a can efficiently separate the solid materials from the gas with a compact size. Specifically, the separator 1a is configured to rotate each of the flow channels 3, thereby increasing the effective length of each of the flow channels 3, and accordingly can efficiently separate the solid materials from the gas with a compact size. The inlet 31 for gas of each of the flow channels 3 is closer to a first end 201 of the rotor 2, and the outlet 32 for gas thereof is closer to a second end 202 of the rotor 2, respectively, in a direction along the rotation axis 21 of the rotor 2. A rotation direction of the rotor 2 is schematically shown in FIG. 1 with a bold arrow. A flow of gas is schematically shown in FIG. 2 with bold arrows. Particles 61 as example of the solid materials discharged from the discharger 6 are also shown schematically in FIG. 2. Hereinafter, "upstream" means a side of upstream (primary side) of a direction of a flow of gas. Also, "downstream" means a side of downstream (secondary side) of a direction of a flow of gas.

Examples of the gas include air, exhaust gas, and the like. Examples of the solid materials suspended in the gas include particles, grits, dusts, and the like. Examples of the particles include particulate matter and the like. Examples of the particulate matter include primary produced particles emitted directly to the atmosphere as particle, and secondary produced particles emitted to the atmosphere as gas and formed into particles in the atmosphere. Examples of the primary produced particles include soil particles (such as yellow dust), dusts, vegetal-origin particles (such as pollen dust), soot (ash), and the like. Examples of the particulate matter include PM2.5 (fine PM), PM10, SPM (suspended particulate matter), and the like, classified based on their sizes. PM2.5 are defined as particles which pass through a size-selective inlet with a 50% efficiency cut-off at 2.5 μm aerodynamic diameter. PM10 are defined as particles which pass through a size-selective inlet with a 50% efficiency cut-off at 10 μm aerodynamic diameter. SPM are defined as particles which pass through a size-selective inlet with a 100% efficiency cut-off at 10 μm aerodynamic diameter, and correspond to PM6.5 to PM7.0 and may be slightly smaller than PM10.

Preferably, the discharger 6 allows discharge of the solid materials suspended in the airstream produced in each of the flow channels 3, in the direction away from the rotation axis 21, at a position nearer to the outlet 32 than the inlet 31 of each of the flow channels 3. With this configuration of the separator 1a, the solid materials with a greater centrifugal force acted thereon are to be discharged through the discharger 6 from each of the flow channels 3.

The separator 1a includes a casing 11 (described later), and the discharger 6 is formed in the casing 11. The discharger 6 is a discharge port formed in part, nearer to the outlet 32 than the inlet 31, of each of the flow channels 3, and directed to a direction perpendicular to the rotation axis 21. In other words, the discharger 6 is the discharge port directed to the direction perpendicular to the rotation axis 21 at a position nearer to the outlet 32 than the inlet 31 of each of the flow channels 3. With this configuration of the separator 1a, the solid materials with a greater centrifugal force acted thereon are to be discharged through the discharge port from each of the flow channels 3.

Preferably, the separator 1a includes a collector 10 for collecting the solid materials discharged from the discharger 6. With this configuration of the separator 1a, the solid materials discharged from the discharger 6 can be collected by the collector 10.

Preferably, the flow channels 3 are not overlapped with each other in the direction away from the rotation axis 21. With this configuration of the separator 1a, the solid material that has been separated from a flow channel 3 by way of the centrifugal force is less likely to be joined in a flow of gas emitted from an outlet 32 of another flow channel 3.

The separator 1a includes: an axle 7 disposed on the rotation axis 21; a frame body 8 with a hollow circular cylindrical shape disposed coaxially with the axle 7 so as to surround the axle 7; and partition boards 9 disposed between the axle 7 and the frame body 8 so as to be arranged at intervals along a circumferential direction of the axle 7. The axle 7 includes a first end 701 and a second end 702 in an axis direction thereof. The axle 7 serves as the rotor 2. Each of the partition boards 9 is coupled with both the axle 7 and the frame body 8. Each of the flow channels 3 is a space surrounded by: two partition boards 9 which are two of the plurality of partition boards 9 and adjacent to each other in the circumferential direction of the axle 7; a side surface 71 of the axle 7, and an inner circumferential surface 81 of the frame body 8. In other words, each of the flow channels 3 is defined by two adjacent partition boards 9, the axle 7, and the frame body 8. When rotating the axle 7, the separator 1a exerts, to the gas in the flow channels 3, a force in a rotation direction around the rotation axis 21. The separator 1a thus can lead the gas introduced through the respective inlets 31 into the flow channels 3 to the respective outlets 32 of the flow channels 3 while helically swirling the gas around the rotation axis 21. The separator 1a can discharge the solid materials suspended in the gas from the discharger 6 with the centrifugal force acted on the solid materials. Note that "the axle 7 disposed on the rotation axis 21" means that the axle 7 is disposed so that the axis of the axle 7 accords with the rotation axis 21. Note that the frame body 8 "disposed coaxially with the axle 7" means that the frame body 8 is disposed so that the center line of the frame body 8 accords with the axis of the axle 7. Examples of meaning of "each of the partition boards 9 is coupled with both the axle 7 and the frame body 8" include not only a case where each of the partition boards 9 is a separate member from the axle 7 and the frame body 8 and fixed to the axle 7 and the frame body 8, but also a case where each of the partition boards 9 is formed integrally with at least one of the axle 7 and the frame body 8. Preferably, the axle 7 has an elongated shape extending in a direction along the rotation axis 21. Note that "the axle 7 has an elongated shape extending in a direction along the rotation axis 21" means that a length of the axle 7 is longer in a direction along the rotation axis 21 than in a direction perpendicular to the rotation axis 21. In the separator 1a, the axle 7, the frame body 8, and the partition boards 9 constitute a cyclone separator 20 configured to helically swirl the gas to separate the solid materials with the centrifugal force acted on the solid materials derived from the swirling.

Preferably, the separator 1a includes the casing 11 enclosing the rotor 2, the flow channels 3, the air current producer 4, and the driving device 5. The discharger 6 is formed in the casing 11. With this configuration of the separator 1a, the rotor 2, the flow channels 3, the air current producer 4, and the driving device 5 can be protected by the casing 11. Moreover, the separator 1a can discharge the solid materials, separated from the airstream, through the discharger 6 of the casing 11.

Figure 3A:
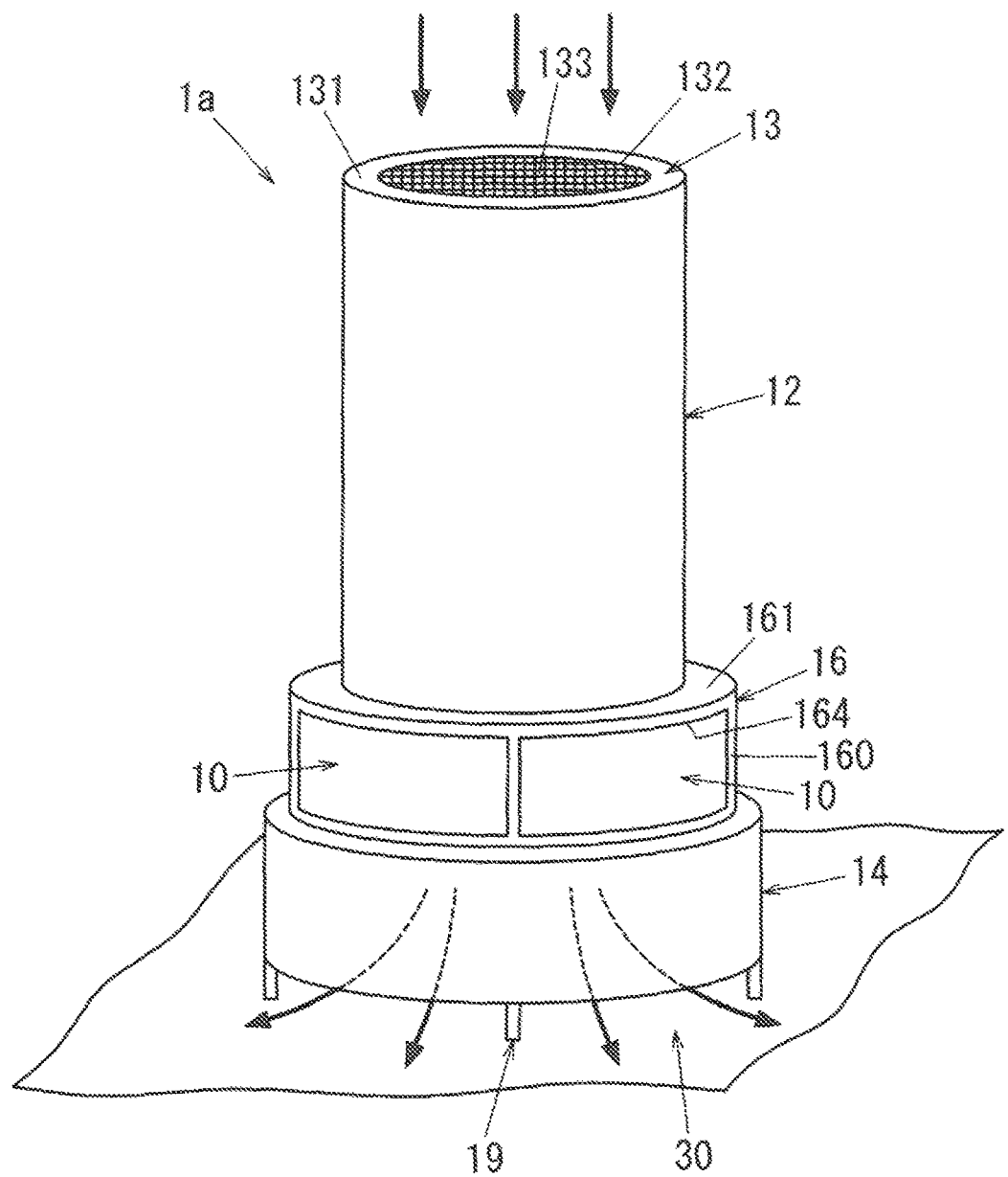
FIG. 3A is a schematic perspective view of the separator according to Embodiment 1.
Figure 3B:
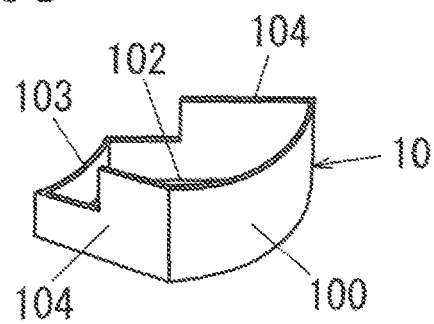
FIG. 3B is a schematic perspective view of a part of the separator according to Embodiment 1.

In an example, the casing 11 includes a first covering part 12, a first cover 13, a second covering part 14, a second cover 15, and a third covering part 16. The third covering part 16 is disposed between the first covering part 12 and the second covering part 14. The third covering part 16 is formed integrally with both the first covering part 12 and the second covering part 14, but is not limited to this. The third covering part 16 may be formed integrally with either one of the first covering part 12 and the second covering part 14, or may be a separate member from the first covering part 12 and the second covering part 14. The first covering part 12 is formed into a hollow cylindrical shape surrounding the frame body 8. The first cover 13 covers an upstream opening 121 of the first covering part 12. The second covering part 14 is formed into a hollow cylindrical shape surrounding the driving device 5. The second cover 15 covers a downstream opening 122 of the second covering part 14. The third covering part 16 is interposed between the first covering part 12 and the second covering part 14. The collector 10 is detachably attached to the third covering part 16. In an example, the collector 10 includes a container 10A. The container 10A of the collector 10 may be a tray (lidless container). The collector 10 is slidable in a direction perpendicular to the rotation axis 21, and can be detached from the third covering part 16 by sliding the collector 10 in a direction away from the rotation axis 21. With this configuration of the separator 1a, the solid materials collected in the collector 10 can be easily removed and dumped. The separator 1a further includes supports 19 (see FIG. 3) for supporting the casing 11. It is accordingly possible to create a space between the casing 11 of the separator 1a and an installation surface (such as a floor surface) 30 for the separator 1a. The support 19 may be a post, but is not limited to this. For example, the support 19 may be a caster or the like. A flow of gas is schematically shown in FIG. 3 with bold arrows.

The first covering part 12 has a hollow circular cylindrical shape, among hollow cylindrical shapes. Examples of the material of the first covering part 12 include metal, synthetic resin, and the like.

The first cover 13 includes a first cover body 131 with a plate shape. The first cover 13 has air intakes 133 allowing the gas to pass through. The first cover body 131 has an outer peripheral shape of a circle.

Examples of the material of the first cover body 131 include metal, synthetic resin, and the like. The air intakes 133 may be holes (openings) of a mesh 132. In short, the first cover 13 includes the first cover body 131 and the mesh 132. The material of the mesh 132 may be metal, for example. When the material of the first cover body 131 is synthetic resin and the material of the mesh 132 is metal, the first cover 13 may be made by an insert molding to mold the first cover body 131 integrally with the mesh 132, for example.

Figure 4:
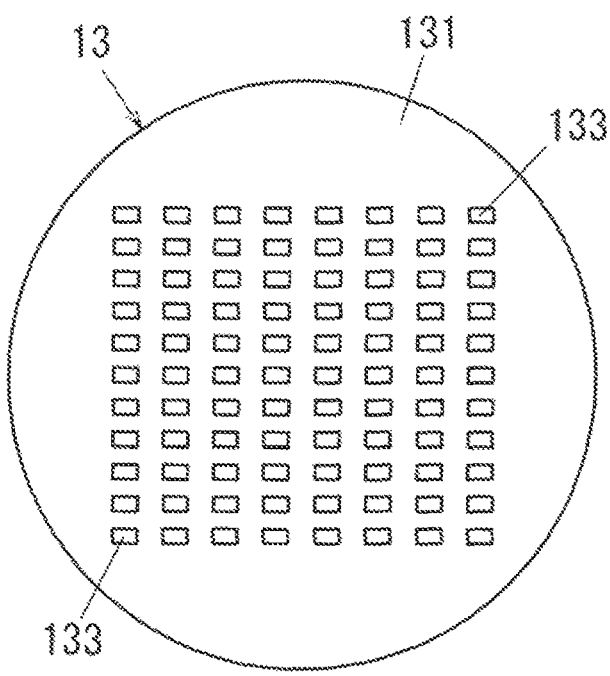
FIG. 4 is a schematic plan view of another example of a first cover in the separator according to Embodiment 1.

The first cover 13 is not limited to include the mesh 132. For example, the first cover 13 may be provided with air intakes 133 each of which has a rectangular shape and are arranged in a two-dimensional array, as shown in FIG. 4.

Figure 5:
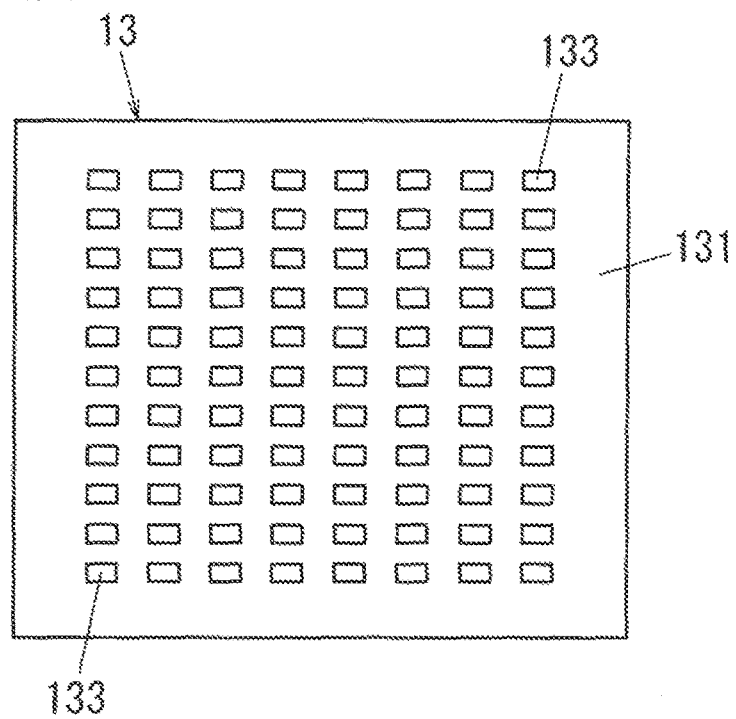
FIG. 5 is a schematic plan view of yet another example of a first cover in the separator according to Embodiment 1.
Figure 6:
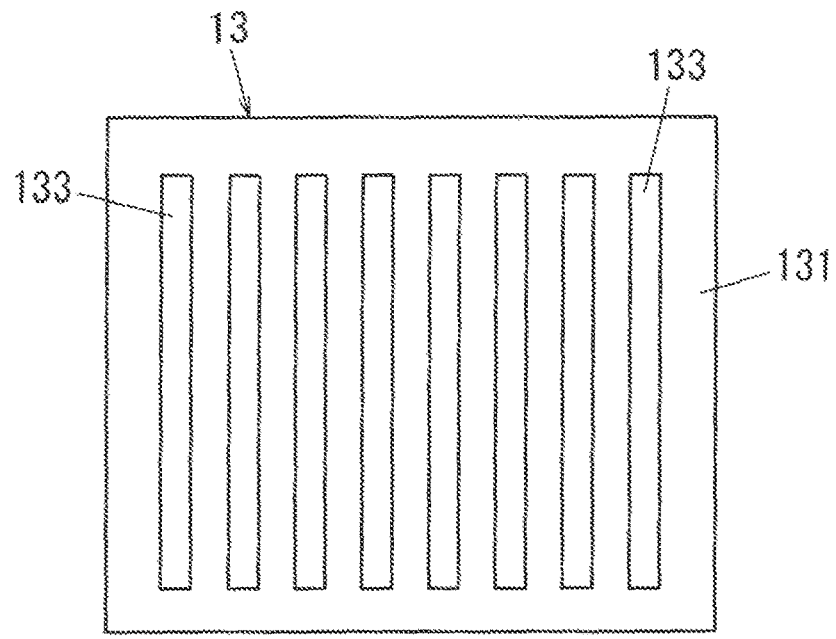
FIG. 6 is a schematic plan view of further yet another example of a first cover in the separator according to Embodiment 1.

For example, the first covering part 12 may have a hollow rectangular cylindrical shape, and the first cover body 131 of the first cover 13 may have an outer peripheral shape of a rectangle (right-angled quadrilateral) as shown in FIG. 5. In the first cover 13 shown in FIG. 4 and the first cover 13 shown in FIG. 5, each of the air intakes 133 has an opening shape of a rectangle and the air intakes 133 are arranged in a two-dimensional array, but the first cover 13 is not limited to this. For example, the first cover 13 may have air intakes 133 each of which has an opening shape of an elongated rectangle and the air intakes 133 are arranged in a one-dimensional array, as shown in FIG. 6. The opening shape of each of the air intakes 133 is not limited to the rectangle and the elongated rectangle, but may be a circle or the like, for example.

The second covering part 14 has a hollow circular cylindrical shape. Preferably, the second covering part 14 has an inner radius larger than an inner radius of the first covering part 12. Examples of the material of the second covering part 14 include metal, synthetic resin, and the like.

Figure 7:
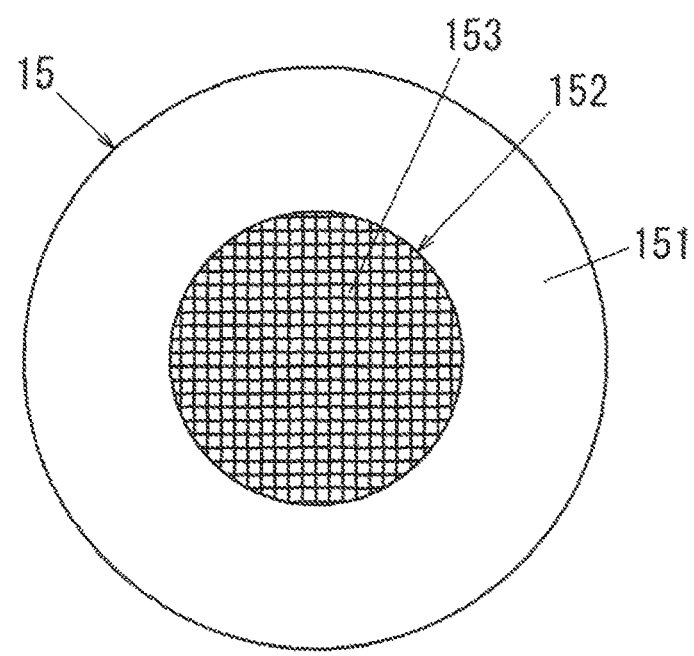
FIG. 7 is a schematic plan view of a second cover in the separator according to Embodiment 1.

As shown in FIG. 7, the second cover 15 includes a second cover body 151 with a circular plate shape. The second cover 15 has air exits 153 allowing the gas to pass through. Examples of the material of the second cover body 151 include metal, synthetic resin, and the like. The air exits 153 may be holes (openings) of a mesh 152. In short, the second cover 15 includes the second cover body 151 and the mesh 152. The material of the mesh 152 may be metal, for example. When the material of the second cover body 151 is synthetic resin and the material of the mesh 152 is metal, the second cover 15 may be made by an insert molding to mold the second cover body 151 integrally with the mesh 152, for example.

Figure 8:
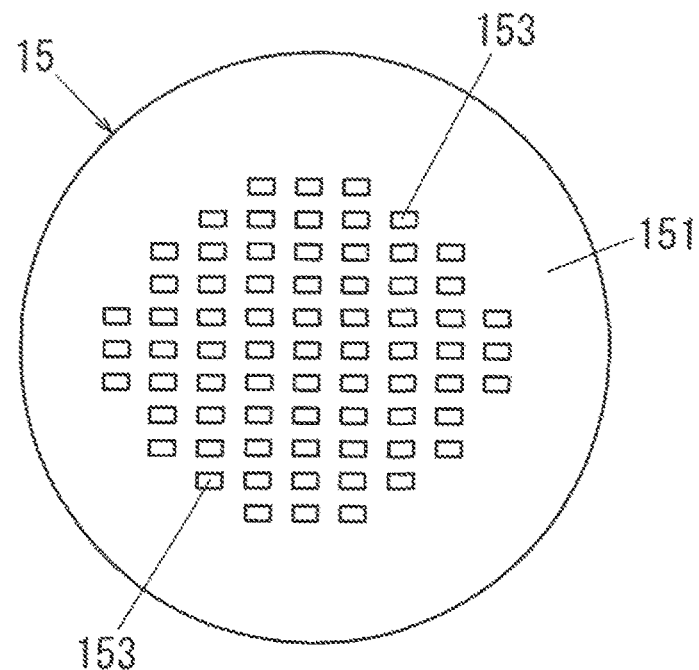
FIG. 8 is a schematic plan view of another example of a second cover in the separator according to Embodiment 1.

The second cover 15 is not limited to include the mesh 152. For example, the second cover 15 may be provided with air exits 153 each of which has a rectangular shape and are arranged in a two-dimensional array, as shown in FIG. 8.

In an example, the third covering part 16 includes a frame 160 (see FIG. 3), a first wall 161, a second wall 162, and an extension 163. The frame 160 is formed into a hollow circular cylindrical shape. The frame 160 has an inner radius larger than an outer radius of the frame body 8. The frame 160 has a center that accords with the rotation axis 21. The first wall 161 is formed into a circular ring shape. The first wall 161 extends from a first end in an axis direction of the frame 160 towards the rotation axis 21. The second wall 162 is formed into a circular ring shape. The second wall 162 extends from a second end in the axis direction of the frame 160 towards the rotation axis 21. The extension 163 is inclined so that a top end thereof is closer to the first wall 161 as well as further away from the rotation axis 21 than a base end thereof is. Described in other words, the extension 163 is formed into a tapered hollow cylindrical shape having an opening of which opening area increases towards the frame body 8 in the direction along the rotation axis 21. In the third covering part 16, an inner radius of the second wall 162 is smaller than an inner radius of the first wall 161. The inner radius of the first wall 161 is larger than the outer radius of the frame body 8. Specifically, the inner radius of the first wall 161 is the same as the inner radius of the first covering part 12. The inner radius of the second wall 162 is smaller than an inner radius of the frame body 8.

The collector 10 collects the solid materials separated from the gas with the centrifugal force acted on the solid materials.

In an example, the collector 10 includes an outer wall 100, a bottom wall 102, side walls 104, and an inner wall 103. Preferably, the outer wall 100 has an arc shape around the rotation axis 21 in a plan view. In the outer wall 100, a curvature radius of a surface, closer to the rotation axis 21, of the outer wall 100 is larger than the outer radius of the frame body 8. The outer wall 100 is arranged along the frame 160 of the third covering part 16 so as to close an opening 164 of the frame 160. The bottom wall 102 extends from a lower end of the outer wall 100 towards the rotation axis 21. The bottom wall 102 has a fan shape in a plan view. The bottom wall 102 is to be disposed on the second wall 162. In short, the bottom wall 102 is to be disposed along the second wall 162. The side walls 104 extend upward from respective side edges of the bottom wall 102. The inner wall 103 extends upward from an end of the bottom wall 102. Preferably, the inner wall 103 has an arc shape around the rotation axis 21 in a plan view. In the inner wall 103, preferably, a curvature radius of a surface, closer to the rotation axis 21, of the inner wall 103 is smaller than the inner radius of the frame body 8. A height of the inner wall 103 is lower than a height of the outer wall 100. The inner wall 103 is configured to come in contact with the extension 163, thereby the collector 10 is positioned with respect to the casing 11 in a direction perpendicular to the rotation axis 21. In the separator 1a, an inner space of the collector 10 is connected to inner spaces of the flow channels 3 and the second covering part 14. Note that "the inner space of the collector 10" means a space surrounded by the outer wall 100, the bottom wall 102, the side walls 104, and the inner wall 103. Preferably, the outer wall 100 of the collector 10 may be provided with a protrusion allowing a user to hold for detaching the collector 10. The inner wall 103 of the collector 10 may be provided with a through-hole continuous with the discharger 6.

The discharger 6 is continuous (connected) with a space between the inner wall 103 and the frame body 8.

In the separator 1a, since the collector 10 includes the inner wall 103, the solid materials entering the collector 10 is efficiently trapped. In other words, in the separator 1a, since the collector 10 includes the inner wall 103, the solid material entering the collector 10 is less likely to escape from the collector 10 towards the rotation axis 21. In the separator 1a, since the extension 163 has the tapered hollow cylindrical shape as described above, it is possible to suppress generation of turbulence caused by the extension 163 and to facilitate introducing the solid material-less airstream towards the air current producer 4.

The air current producer 4 includes a fan 41. With this configuration, the separator 1a can cause gas to flow through the flow channels 3 by operating the fan 41. The fan 41 is disposed inside the second covering part 14 and on the downstream of the driving device 5. The fan 41 may be an electric fan. In the separator 1a, the air current producer 4 and the driving device 5 are fixed to the casing 11.

The separator 1a may include an operated part of an operation switch for start operating the air current producer 4 and the driving device 5. The operated part may be exposed on the outside of the casing 11.

The separator 1a further includes an air filter 17 disposed inside the second covering part 14 and on the upstream of the driving device 5. With this configuration of the separator 1a, solid materials, which are not separated by the cyclone separator 20 and are still suspended in the airstream, can be removed by the air filter 17. Hence, the airstream emitted through the air exits 153 can be further cleaned. In the separator 1a, shapes of the frame body 8, the axle 7, and the partition boards 9, the rotation ratio of the rotor 2, and the like are appropriately set so that the separator 1a can separate a particle having a desired particle size. The particle having a desired particle size may be a particle of which aerodynamic particle size is 1.0 μm, for example. Note that the "aerodynamic particle size" means a diameter of a particle whose aerodynamic behavior is equivalent to that of a round particle having a specific gravity of 1.0. The aerodynamic particle size is measured based on setting velocity of the particle. The solid materials not separated by the cyclone separator 20 and still suspended in the gas may include fine particles smaller in the particle size (namely, fine particles smaller in the mass) than the particles which the cyclone separator 20 intends to separate. Note that "removed by the filter 17" does not necessarily mean the trapping efficiency of 100%. However, the air filter 17 has a trapping efficiency of the solid materials suspended in the gas as high as possible.

Components of the separator 1a will be explained in further detail hereinafter.

The axle 7 is disposed so that the axis of the axle 7 accords with the rotation axis 21. In other words, in the separator 1a, the axle 7 is disposed so that the axis of the axle 7 and the rotation axis 21 are on a same line. The axle 7 is configured to rotate around the rotation axis 21. In the separator 1a, since the axle 7 serves as the rotor 2, the axis of the axle 7 is the same as the rotation axis 21.

The axle 7 prohibits the gas and the solid materials suspended in the gas from passing therethrough. Specifically, the axle 7 has a non-porous structure. Examples of the material of the axle 7 include metal, synthetic resin, and the like. Preferably, the axle 7 has electrical conductivity. With this configuration of the separator 1a, electric charge in the axle 7 can be suppressed.

Preferably, the axle 7 has a circular shaped cross-section perpendicular to the rotation axis 21. The axle 7 may be hollow. With this configuration of the separator 1a, the material cost and weight of the axle 7 can be reduced.

The frame body 8 is formed into a hollow circular cylindrical shape. Preferably, an inner circumference of a cross-section perpendicular to the rotation axis 21 of the frame body 8 may be a circle. In the frame body 8, an outer circumference of the cross-section perpendicular to the rotation axis 21 is a circle, but is not limited thereto. For example, the shape may be an ellipse, a polygon, or the like.

Examples of the material of the frame body 8 include metal, synthetic resin, and the like. Preferably, the frame body 8 has electrical conductivity. With this configuration of the separator 1a, electric charge in the frame body 8 can be suppressed.

Each of the partition boards 9 is formed in a helical shape. Examples of the material of the partition board 9 include metal, synthetic resin, rubber, and the like. Preferably, the partition boards 9 have electrical conductivity. With this configuration of the separator 1a, electric charge in the partition boards 9 can be suppressed.

The partition boards 9 may be formed integrally with the axle 7, or may be formed as separate members from the axle 7 and coupled with the axle 7. The partition boards 9 may be formed integrally with the frame body 8, or may be formed as separate members from the frame body 8 and coupled with the frame body 8.

Each of the partition boards 9 has a surface that crosses with a rotation direction around the rotation axis 21. Accordingly, both surfaces in a thickness direction of each of the partition boards 9 function as functional faces facilitating swirling of the gas.

Each of the flow channels 3 extends from the inlet 31 to the outlet 32 in a direction between the rotation direction around the rotation axis 21 and a direction parallel to the rotation axis 21. With this configuration of the separator 1a, each of the flow channels 3 can have a longer length than that in a case where flow channels 3 each extend from an inlet 31 to an outlet 32 in a direction parallel to a rotation axis 21. With this configuration of the separator 1a, it is possible to increase an effective length of each of the flow channels 3 when the flow channels 3 is rotated (a distance that the gas actually travels from the inlet 31 to the outlet 32 in the flow channel 3), and the separation of the solid materials can be further facilitated. The gas flowing through each of the flow channels 3 has a velocity vector having a velocity component in a direction parallel to the rotation axis 21 and a velocity component in the rotation direction around the rotation axis 21. The separator 1a can increase a time during which the airstream swirls compared to a case where each of flow channels 3 has a linear shape, and accordingly the separation of the solid materials can be further facilitated. Each of the flow channels 3 has, at a start point, an opening serving as the inlet 31, and, at an end point, another opening serving as the outlet 32.

Each of the flow channels 3 is helix. With this configuration, the separator 1a can increase a time during which the airstream swirls in each of the flow channels 3, and accordingly the separation of the solid materials can be further facilitated.

The discharger 6 is located at a position nearer to the outlet 32 than the inlet 31 in each of the flow channels 3 to efficiently discharge the solid materials. In other words, a distance between the discharger 6 and each outlet 32 is shorter than a distance between the discharger 6 and a corresponding inlet 31. With this configuration, the separator 1a can increase a time for the solid materials suspended in the gas to move in each of the flow channels 3 towards the inner circumferential surface 81 of the frame body 8 with the centrifugal force. The trapping efficiency can be increased accordingly.

In a case where the driving device 5 includes a motor 50 (described later), the separator 1a may include a setting unit for setting a rotation ratio of the motor 50. With this configuration of the separator 1a, the rotation ratio of the motor 50 can be appropriately changed in consideration of a size and the like of the solid material required to be separated. The setting unit may include a potentiometer or the like, for example.

The separator 1a is configured to rotate the axle 7 by the driving device 5 in a counterclockwise direction in a plan view while operating the fan 41, thereby helically swirling the airstream in each of the flow channels 3. Accordingly, the separator 1a allows the gas entering each of the flow channels 3 through the inlet 31 to flow towards the outlet 32 while helically swirling the gas. Note that "rotate the axle 7 in a counterclockwise direction in a plan view" means rotating the axle 7 in a counterclockwise direction as seen from a side opposite to the driving device 5, and is same in the meaning as rotating the axle 7 in a clockwise direction as seen from a side of the driving device 5.

Preferably, each of the flow channels 3 includes a section connected to the inlet 31 a distance of which from the rotation axis 21 increases with an increase in a distance from the inlet 31. With this configuration of the separator 1a, it is possible to reduce a pressure loss (pressure drop) while the gas entering each of the flow channels 3, compared to a separator 1b shown in FIG. 12 which serves as a first modified example of the separator 1a according to Embodiment 1 and in which a distance between each of the flow channels 3 and the rotation axis 21 is constant.

The separator 1b according to the first modified example differs from the separator 1a in that the separator 1b includes an axle 7 having a constant outer radius and a frame body 8 having a constant inner radius. For illustrating the separator 1b according to the first modified example, like components as those of the separator 1a are designated by the same reference numerals.

Figure 12:
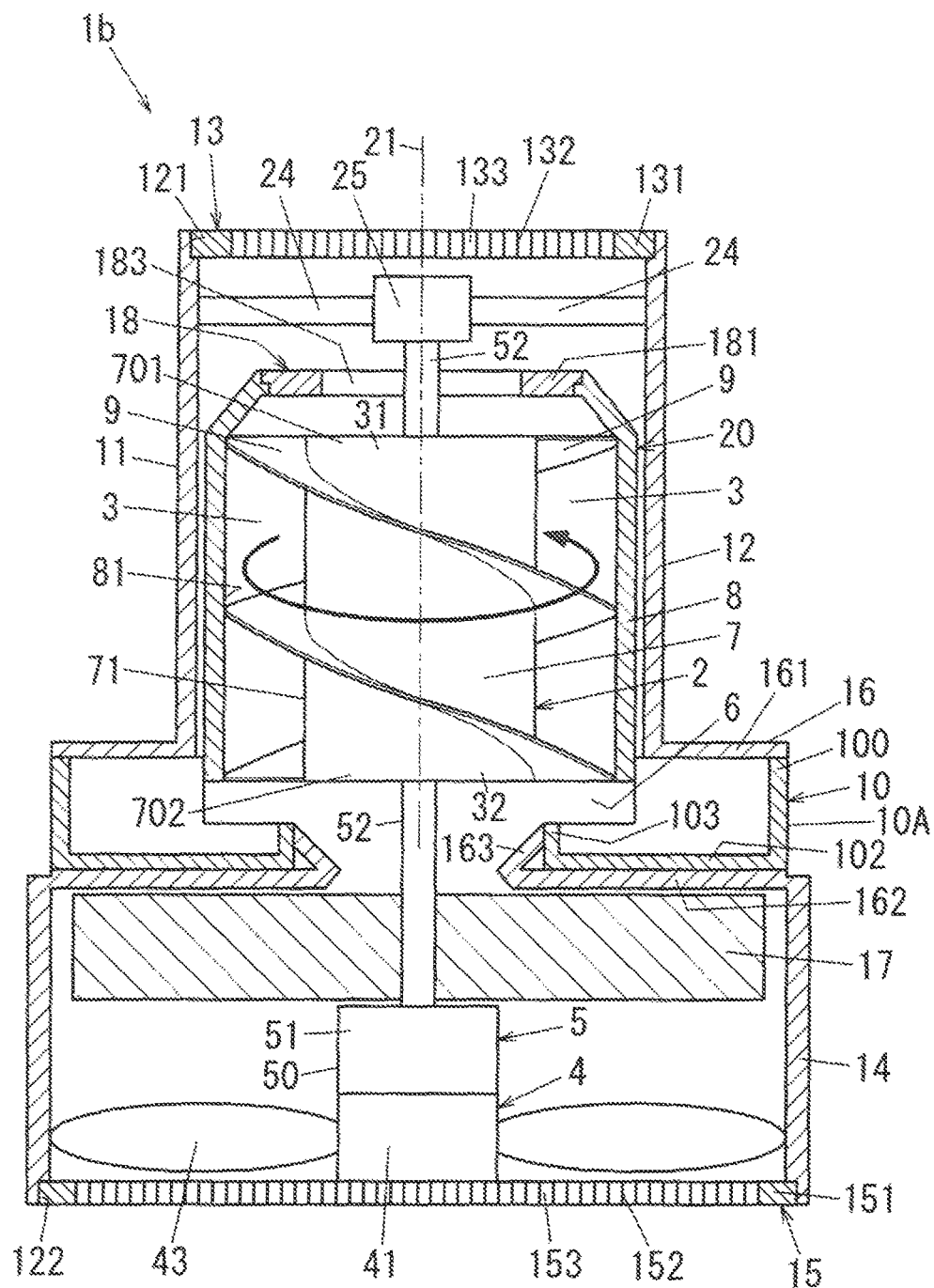
FIG. 12 is a schematic configuration diagram of a separator according to a first modified example of Embodiment 1.
Figure 13:
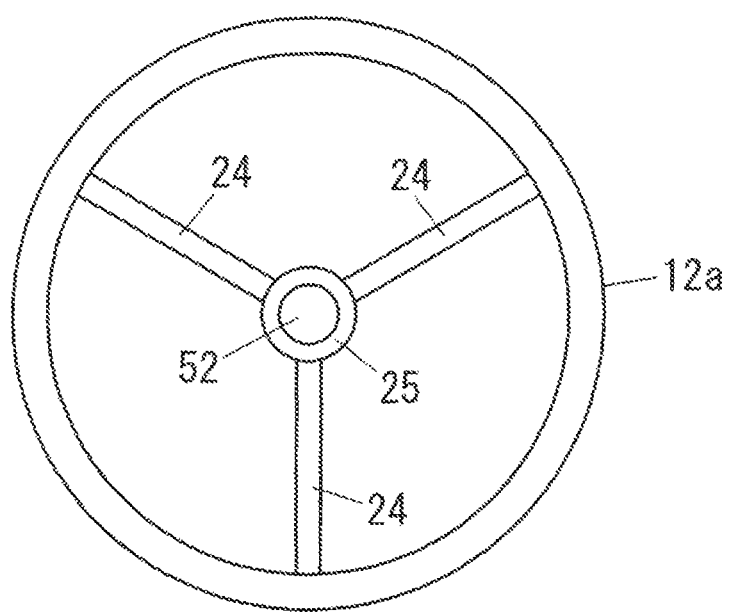
FIG. 13 is a schematic plan view of a part of the separator according to the first modified example of Embodiment 1.

As shown in FIGS. 12 and 13, the separator 1b according to the first modified example includes a bearing 25 supported to the first covering part 12 by the beams 24. A rotation axle 52 protrudes from an end face, closer to a first cover 13, of the axle 7, and the bearing 25 pivotally holds the rotation axle 52.

In the separator 1a of the present embodiment, the axle 7 is tapered at an upstream end. A shape of the taper may have a conical shape, for example. In the separator 1a, the frame body 8 has a section at an upstream end an opening area of which gradually decreases towards the upper stream side.

The separator 1a includes a cover part 18 for covering an upstream opening of the frame body 8. The cover part 18 includes a main body 181 with a circular plate shape. The main body 181 is provided with vent (vent hole) 183. In other words, the cover part 18 has the vent 183. Preferably, the axle 7 includes a section tapered along the rotation axis 21 on the side of the inlet 31 of each of the flow channels 3. In other words, the axle 7 is tapered towards the vent 183 along the rotation axis 21 at the first end 701 which is closer to the vent 183 than the second end 702 is. With this configuration of the separator 1a, it is possible to reduce a pressure loss while the fluid entering each of the flow channels 3. Preferably, the frame body 8 includes a section at the upstream end an opening area of which gradually decreases towards the upper stream side.

Figure 9:
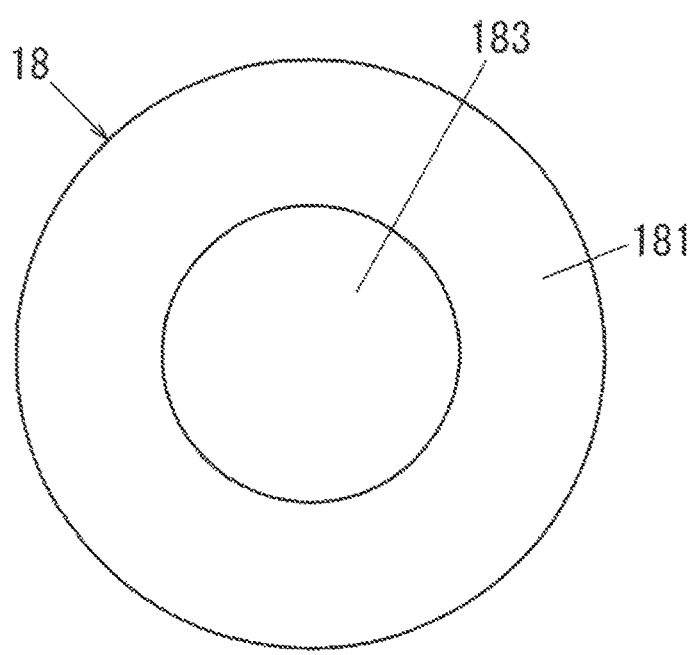
FIG. 9 is a schematic plan view of a cover part in the separator according to Embodiment 1.

Examples of the material of the main body 181 include metal, synthetic resin, and the like. For example, the vent 183 may include a through hole penetrating the center of the main body 181, as shown in FIG. 9. Preferably, the through hole has an opening shape of a circle.

Figure 10:
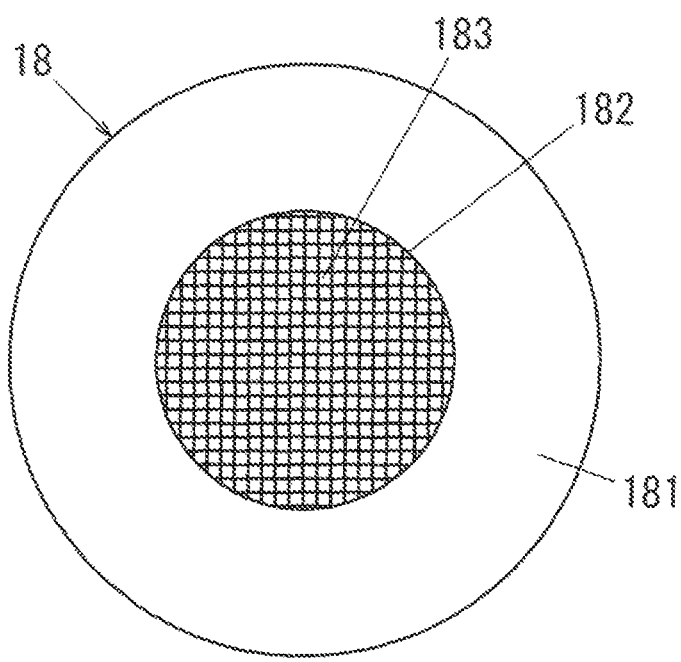
FIG. 10 is a schematic plan view of another example of a cover part in the separator according to Embodiment 1.

As shown in FIG. 10, the vent 183 may be holes of a mesh 182. The material of the mesh 182 may be metal, for example. When the material of the main body 181 is synthetic resin and the material of the mesh 182 is metal, the cover part 18 may be made by an insert molding to mold the main body 181 integrally with the mesh 182, for example.

Figure 11:
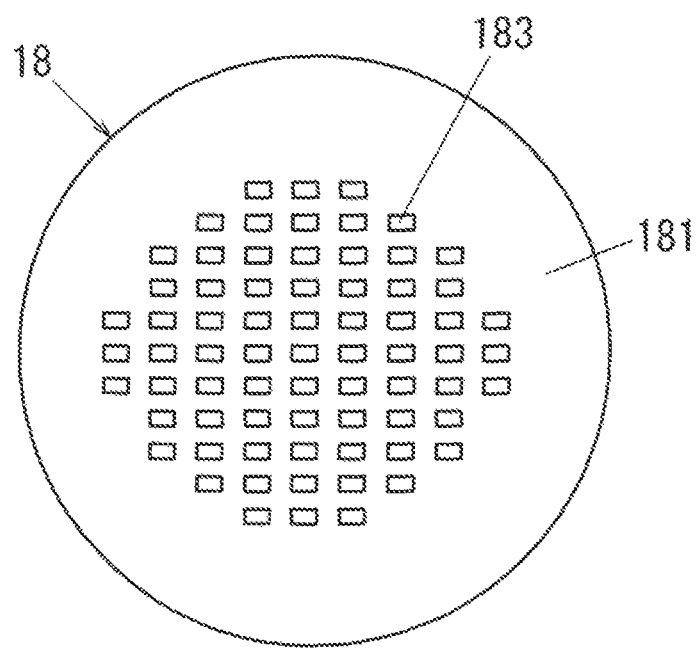
FIG. 11 is a schematic plan view of yet another example of a cover part in the separator according to Embodiment 1.

As shown in FIG. 11, the vent 183 may include through holes arranged two-dimensionally in the center of the main body 181. Each of the through holes has an opening shape of a rectangle, but is not limited thereto. The opening shape may be a circle, a polygon other than the rectangle, or the like.

The axle 7 is tapered along the rotation axis 21 at the second end 702 which is closer to the outlet 32 of each of the flow channels 3 than the first end 701 is. With this configuration of the separator 1a, generation of turbulence can be suppressed. The axle 7 is tapered at an end closer to the air current producer 4. Specifically, in the axle 7, the end closer to the air current producer 4 has a conical shape.

The fan 41 of the air current producer 4 may be an axial fan, for example. Preferably, the fan 41 includes blades 43 which are not overlapped with the driving device 5 as seen from an end of the rotation axis 21. With this configuration of the separator 1a, the fan 41 can cause the gas exiting from each of the flow channels 3 to flow in a direction along the rotation axis 21.

For example, the driving device 5 may include the motor 50. In the separator 1a, the axle 7 is coupled to the rotation axle 52 of the motor 50. In the separator 1a, the rotation axle 52 and the axle 7 are coupled with each other with an axis of the rotation axle 52 and an axis (the rotation axis 21) of the axle 7 aligned on a same line. The driving device 5 is configured to rotate the axle 7. Specifically, the driving device 5 is configured to rotate the rotor 2 in a direction same as a helical direction of each of the flow channels 3 from the inlet 31 to the outlet 32 (rotate the rotor 2 in a direction along the helical direction). Preferably, the motor 50 has a motor body (housing) 51 with an outer circumferential shape of a circle. Preferably, the motor body 51 of the motor 50 has an outer radius smaller than the inner radius of the frame body 8. Preferably, the outer radius of the motor body 51 of the motor 50 is smaller than an outer radius of a center part, in the axial direction, of the axle 7.

The air filter 17 may be a filter for removing the particles from the gas. The air filter 17 may include filtering media woven in pleated manner, for example. The air filter 17 may include a high efficiency particulate air filter (HEPA filter), for example. The HEPA filter is an air filter that removes at least 99.97% of particles having 0.3 μm in diameter in a rated flow, and has an initial pressure loss less than or equal to 245 Pa.

In the separator 1a, the cyclone separator 20 is disposed on the upstream of the air filter 17, and the solid materials can be captured by the collector 10. It is accordingly possible to suppress the increase in the pressure loss caused by increasing in the total amount of the particles and the like trapped in the air filter 17. With this configuration of the separator 1a, the replacing frequency of the air filter 17 can be reduced. The separator 1a is not limited to include the air filter 17. For example, an apparatus (such as an air purifier) includes the separator 1a, and may further include an air filter such as a HEPA filter which is a separate member from the separator 1a and provided on the downstream of the separator 1a.

In the separator 1a, the driving device 5 is disposed on the downstream of the flow channels 3, and the air current producer 4 is disposed on the downstream of the driving device 5. In short, in the separator 1a, the flow channels 3, the driving device 5 and the air current producer 4 are arranged in an order of the flow channels 3, the driving device 5 and the air current producer 4 in the direction along the rotation axis 21. In the separator 1a, when the air current producer 4 is operated while the driving device 5 rotates the axle 7, the gas flows into each of the flow channels 3 and the solid materials suspended in the gas are collected in the collector 10 with the centrifugal force acted thereon. With the separator 1a, accordingly, the gas flowing through the air current producer 4 has a reduced concentration of the solid materials.

Specifically, in the separator 1a, the gas on the outside of the casing 11 enters the inside of the casing 11 through the air intakes 133, then enters the flow channels 3 to generate the swirling flow of the gas in each of the flow channels 3, and then exits from the flow channels 3 through the respective outlets 32. The solid materials suspended in the gas entering the inside of the casing 11 from the outside is acted thereon the centrifugal force in a direction from the rotation axis 21 to the inner circumferential surface 81 of the frame body 8 while the solid materials swirls in each of the flow channels 3 with the swirling flow. The solid materials move towards the inner circumferential surface 81 of the frame body 8 with the centrifugal force acted thereon, and swirl near the inner circumferential surface 81 of the frame body 8. In the separator 1a, when the swirling solid material moves near the discharger 6, the solid material enters the collector 10 through the discharger 6 with the centrifugal force acted thereon. The particles 61 as example of the solid materials entering the collector 10 are schematically shown in FIG. 2.

Entering the collector 10, the solid materials would keep flying due to the rotational inertial force, but eventually fall to the collector 10 due to the gravity acted thereon. Consequently, the solid materials are captured by the collector 10. In other words, in the separator 1a, the solid materials enter the container 10A and are accumulated in the container 10A.

In the separator 1a, the solid materials not captured by the collector 10 may be trapped by the air filter 17, and thus the cleaned gas passes through the fan 41 and flows out from the inside of the casing 11 to the outside of the casing 11 through the air exits 153. Fine particles 62 as example of the solid materials trapped by the air filter 17 are schematically shown in FIG. 2. Note that "the solid material not captured by the collector 10" are constituted mainly by the solid materials not discharged from the discharger 6, and may include the solid materials that once enter the collector 10 but escape from the collector 10.

The inventors of the present application considered a first structural model of cyclone which includes: a structure constituted by a circular cylinder provided with a helical groove in an outer circumferential surface thereof; and a hollow circular cylinder surrounding the structure, wherein a flow channel is defined by a space surrounded by an inner circumferential surface of the hollow circular cylinder and inner surfaces of the groove. Particle size (critical particle diameter) of particles which the first structural model can separate from the gas flowing through the flow channel without rotating the circular cylinder can be calculated according to the following eq.(1). The eq.(1) is developed from the concept of Rosin (see, for example Document 3 "Kagakukikai no riron to keisan (second edition)", edited by Saburo KAMEI, Sangyo Tosho, 1975, Page 483).

$$D_{min} = K_1 \sqrt{\frac{9uB}{\pi N v_i (\rho_s - \rho_f)}} \qquad \text{eq. (1)}$$

In eq.(1), "$D_{min}$" denotes the critical particle diameter, theoretically collected with 100% efficiency. "u" [Pa·s]

denotes the viscosity coefficient of fluid. "B" [m] denotes the width of the flow channel. "π" denotes the mathematical constant Pi. "N" [rpm] denotes the number of rotations of the flow channel. "$v_i$" [m/sec] denotes the gas velocity. "$\rho_s$" [kg/m³] denotes the particle density. "$\rho f$" [kg/m³] denotes the fluid density. "$K_1$" is the coefficient and preferably is a value of about 0.5 to 1.5. The value of "$K_1$" may vary according to a shape or the like of particle separation device with the first structural model, and may be determined according to experimental result and the like of particle separation performance of the particle separation device. The "critical particle diameter" means a particle size with a ratio of particles that passes through the particle separation device. For example, the critical particle diameter, theoretically collected with 100% means that 100% of the particles with the particle diameter pass therethrough.

According to the eq.(1), examples of method for efficiently removing the particles may include: increasing the length of the flow channel which depends on the number of rotations "N" of the flow channel (option 1); increasing the gas velocity of the gas (option 2); narrowing the width of the flow channel (option 3); and the like.

However, the option 1 may cause increase in the pressure loss. Also, the option 1 may cause a problem, in a design of the cyclone, of increasing in size of the cyclone. The option 2 may cause increase in the pressure loss. Also, the option 2 may cause a problem, in a design, that it is difficult to obtain an expected separation performance in a turbulent flow region. The option 3 may cause increase in the pressure loss. Also, the option 3 may cause a problem, in a design of the cyclone that, even when the inner circumferential surface of the hollow circular cylinder is designed to have a constant surface roughness, a gap(s) may be provided between the circular cylinder and the hollow circular cylinder other than the flow channel due to the tolerance of the products of the circular cylinder and the hollow circular cylinder to allow the air to flow therethrough, resulting in difficulty in a design. Also, the option 3 may cause a problem that it is difficult to increase the flow rate.

According to a general concept of the pressure loss, the pressure loss caused in a fluid flowing through a pipe with a hollow circular cylindrical shape can be calculated according to the Fanning's equation expressed by the following eq.(2).

$$\Delta P_f = 4f \frac{\rho V^2}{2} \cdot \frac{L}{D} \qquad \text{eq. (2)}$$

In the eq.(2), "$\Delta P_f$" [Pa] denotes the pressure loss. "$\rho$" [kg/m³] denotes the density of fluid. "V" [m³/s] denotes the air quantity. "L" [m] denotes the length of the pipe. "D" [m] denotes the inner diameter of the pipe. "f" denotes the friction coefficient depending on the surface roughness of the inner surface of the pipe, and can be calculated according to the following eq.(3).

$$f = 16 \frac{u}{\rho V D} \qquad \text{eq. (3)}$$

In eq.(3), "u" [Pa·s] denotes the viscosity coefficient of fluid.

In order to design the structure of the separator 1a, the inventors of the present application considered a second structural model of the cyclone and an estimated theoretical equation indicated by eq.(4), based on the eq.(1). The second structural model includes: an axle of a circular cylinder; a hollow circular cylinder surrounding the axle; partition boards protruding from a side surface of the axle towards an inner circumferential surface of the hollow circular cylinder. In the second structural model, the axle is configured to rotate around an axis thereof. In the second structural model, each of the partition boards has a section, perpendicular to a radial direction of the axle, having a line shape along the axis of the axle. In the second structural model, each of flow channels is a space surrounded by: partition boards adjacent to each other in a circumferential direction of the axle, of the partition boards; the inner circumferential surface of the hollow circular cylinder; and the side surface of the axle.

$$D_{min} = K_2 \sqrt{\frac{18 u B v_p}{LR(\rho_s - \rho_f)\omega^2}} \qquad \text{eq. (4)}$$

In the eq.(4), "$D_{min}$" denotes the critical particle diameter, theoretically collected with 100% efficiency. "u" [Pa·s] denotes the viscosity coefficient of fluid. "B" [m] denotes the width of flow channel. "$v_p$" [m/sec] denotes the velocity component, in a direction parallel to the axis of the axle, of velocity vector of helically moving particle. "L" [m] denotes the geometric length of the flow channel. Note that the "geometric length of the flow channel" means a length of the flow channel from the inlet to the outlet when the flow channel is not rotating. In the second structural mode, thus, the "geometric length of the flow channel" equals to a length [m] of the axle. "R" [m] denotes the distance from the axis of the axle to a center of the flow channel, in a direction perpendicular to the axis of the axle. "B" may be an average value of the inner diameter of the hollow circular cylinder and the outer diameter of the axle, for example. "ρs" [kg/m³] denotes the particle density. "$\rho_f$" [kg/m³] denotes the fluid density. "ω" [rad/s] denotes the angular velocity, in a rotational direction around the axis of the axle, of the particle. "$K_2$" is the coefficient and preferably is a value of about 0.5 to 1.5. The value of "$K_2$" may vary according to a shape or the like of the separator 1a. The value of "$K_2$" may be determined according to experimental result and the like of particle separation performance of the separator 1a. The transit time of the particle in the flow channel can be expressed by eq.(5), with the parameters described according to the eq.(4).

$$T = \frac{L}{v_p} \qquad \text{eq. (5)}$$

In eq.(5), "T" [s] denotes the transit time of the particle in the flow channel.

The centrifugal force acted on a solid material is proportional to the mass of the solid material as well as the radius of the circular motion of the solid material. The radius of the circular motion is a distance between the rotation axis 21 and the solid material. The centrifugal force acts on the solid material in a direction from the center (origin) of the circle to the solid material while the solid material moves with the velocity of "v" along the circle having the radius of "r". Expressing the mass of the solid material by "m", the magnitude of the centrifugal force is represented by the equation "mv²/r". Expressing the angular velocity by "ω" which leads the equation "v=rω", the magnitude of the centrifugal force is also represented by the equation "mω²r". In short, the centrifugal force is proportional to square of "ω".

The separator 1a can be downsized and maximized in the flow rate when the cyclone separator 20 is designed to satisfy the estimated equation of the eq.(4). However, the separator 1a is not limited to satisfy the eq.(4). Since the separator 1a is configured to rotate the flow channel 3, it is possible to reduce the geometric length of the flow channel 3, to increase the gas velocity, to increase the number of rotations of the flow channel 3, and the like. Therefore, the separator 1a with an increased width of the flow channel 3 still can efficiently remove the solid materials, and thus can suppress the increase in the pressure loss while increasing the separation efficiency of the solid materials. The separator 1a thus can have a larger flow rate, a high efficiency, and a reduced size. For example, the separator 1a may be applied to such an air purifier that is required to have the capability of separating the PM2.5 with the air quantity of 8 [m³/min].

Not limited to the air purifier, the separator 1a can be applied to a heat exchanger, an electric vacuum cleaner, a particle classification device, and the like, for example.

Figure 14:
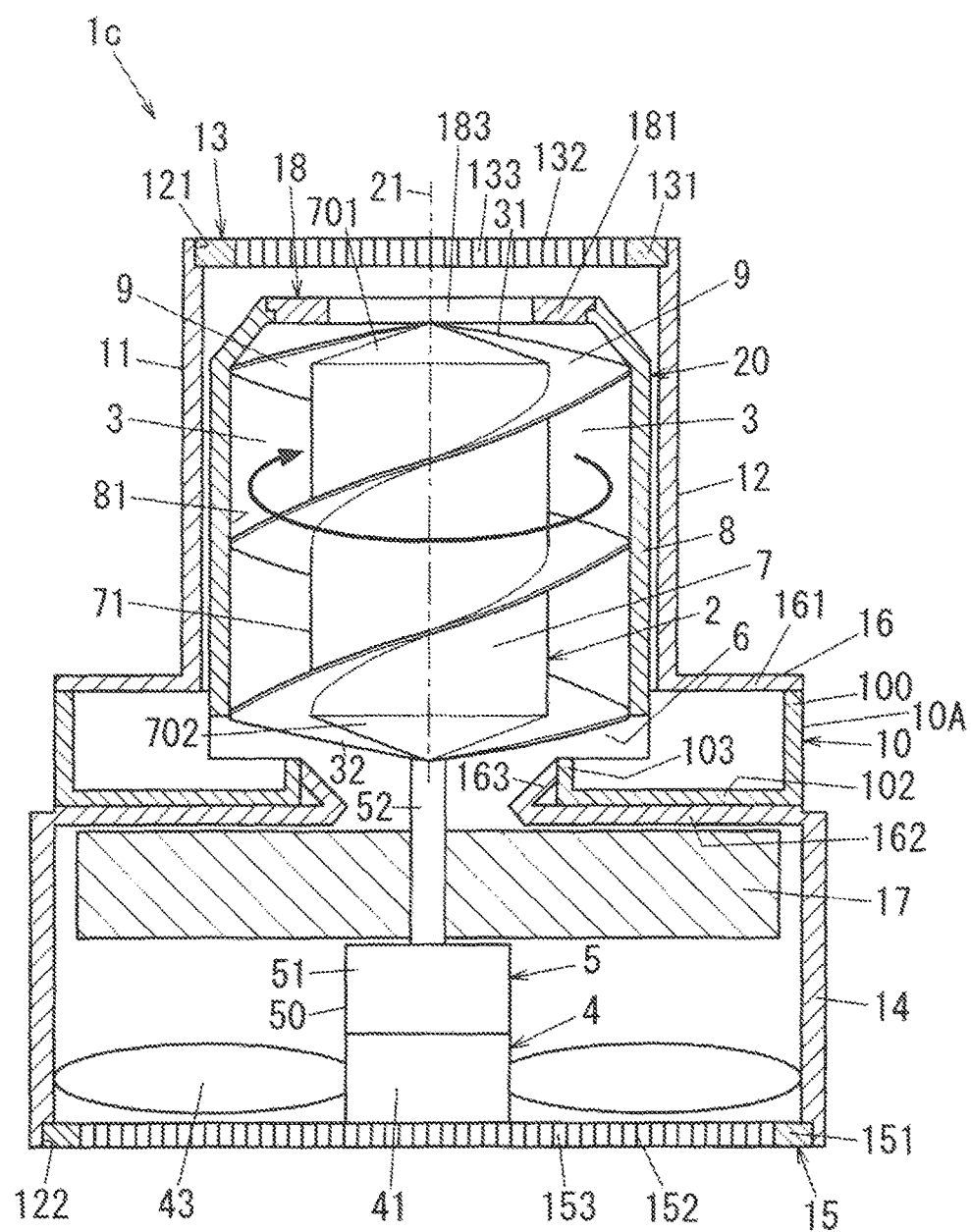
FIG. 14 is a schematic configuration diagram of a separator according to a second modified example of Embodiment 1.

FIG. 14 is a schematic configuration diagram of a separator 1c serving as a second modified example of the separator 1a according to Embodiment 1.

The separator 1c according to the second modified example has a basic configuration same as that of the separator 1a according to Embodiment 1, and differs therefrom in that a helical direction of each of partition boards 9 of the separator 1c is opposite to a helical direction of each of the partition boards 9 of the separator 1a. Therefore, a helical direction of each of flow channels 3 of the separator 1c according to the second modified example is opposite to the helical direction of each of the flow channels 3 of the separator 1a. In the separator 1c according to the second modified example, preferably, a rotation direction of a rotor 2 is the same as the helical direction of each of the flow channels 3 from an inlet 31 to an outlet 32 (in a direction along the helical direction), as seen from a side opposite of a rotor 2 from a driving device 5. Preferably, the rotation direction of the rotor 2 of the separator 1c is opposite to the rotation direction of the rotor 2 of the separator 1a. A rotation direction of the rotor 2 is schematically shown in FIG. 14 with a bold arrow.

Figure 15:
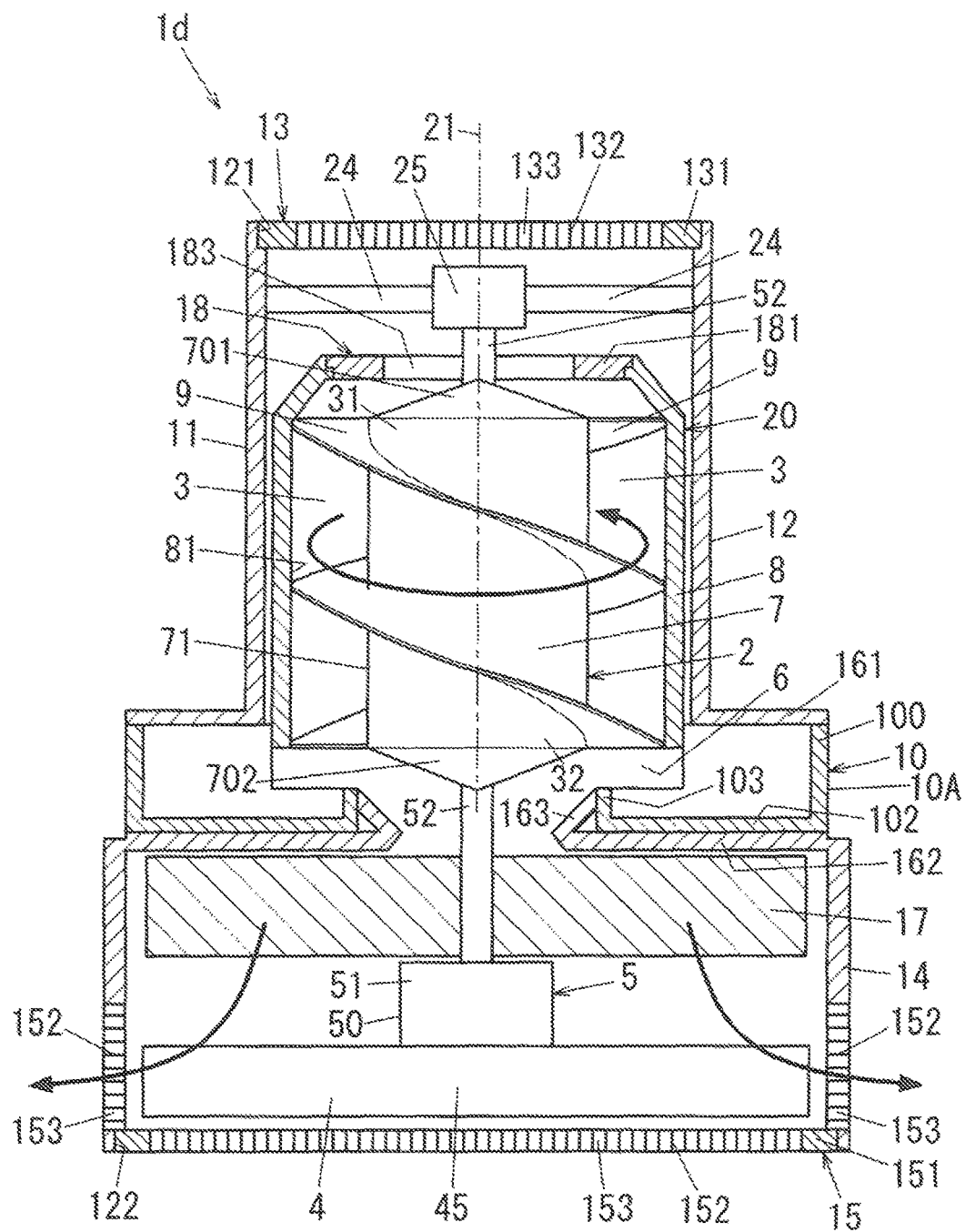
FIG. 15 is a schematic configuration diagram of a separator according to a third modified example of Embodiment 1.
Figure 16:
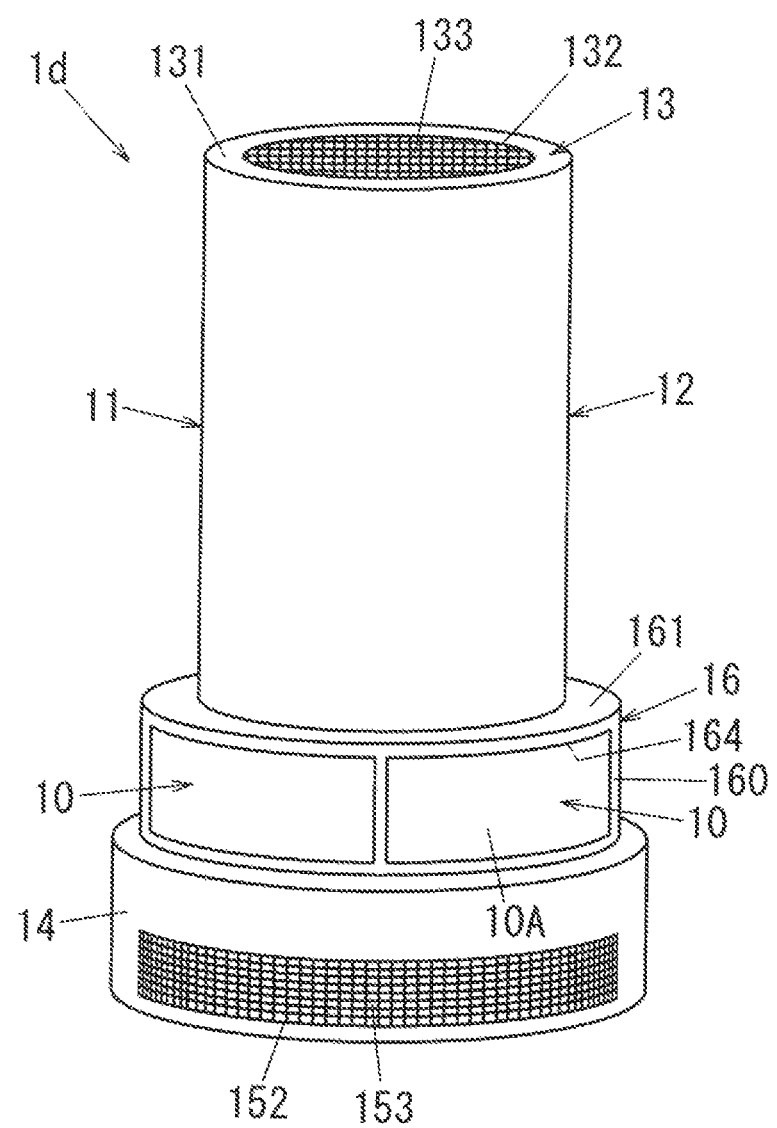
FIG. 16 is a schematic perspective view of the separator according to the third modified example of Embodiment 1.
Figure 17:
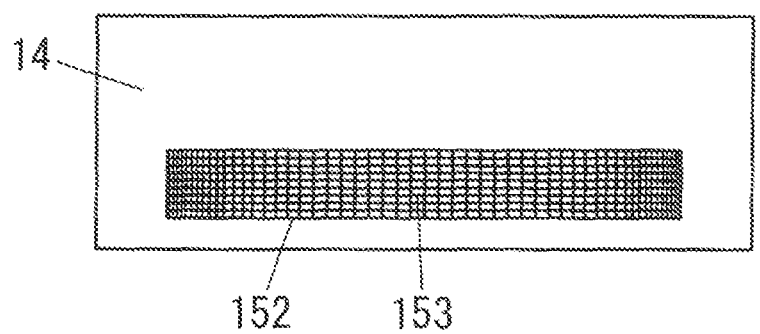
FIG. 17 is a schematic front view of a part of the separator according to the third modified example of Embodiment 1.

A separator 1d, serving as a third modified example of the separator 1a according to Embodiment 1, will be described with reference to FIGS. 15 to 17. For illustrating the separator 1d, like components as those of the separator 1a according to Embodiment 1 are designated by the same reference numerals and are not described again.

Similar to the separator 1b according to the first modified example, the separator 1d includes a bearing 25 supported to a first covering part 12 by beams 24. The bearing 25 pivotally holds a rotation axle 52 protruding from an axle 7.

The separator 1d includes, as an air current producer 4, a blower 45 configured to cause gas to flow sideways, in place of the axial fan as the fan 41. In short, in the separator 1d, the air current producer 4 includes the blower 45. With this configuration, the separator 1d can cause gas to flow through flow channels 3 by operating the air current producer 4. A flow of gas is schematically shown in FIG. 15 with bold arrows. The blower 45 may be an electric blower, and be configured to adjust (change) the direction of airstream.

In the separator 1d according to the third modified example, air exits 153 allowing the gas to pass are provided in a second covering part 14, instead of in a second cover 15. The separator 1d thus can omit the supports 19 (see FIG. 3) of the separator 1a.

Figure 18:
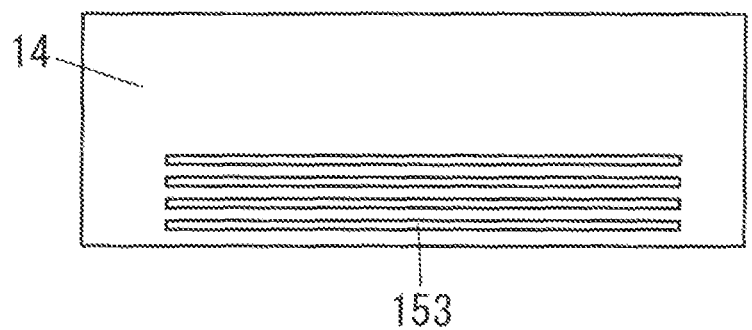
FIG. 18 is a schematic front view of another example of the part of the separator according to the third modified example of Embodiment 1.
Figure 19:
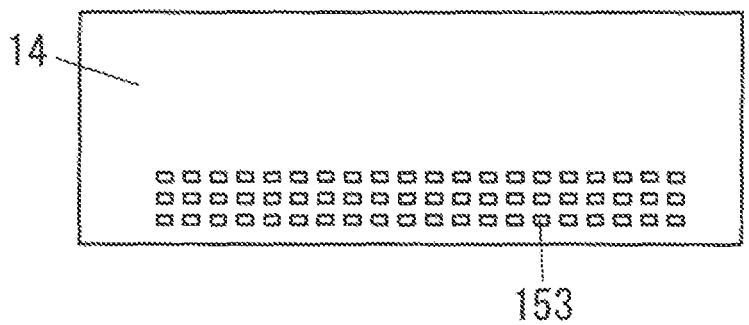
FIG. 19 is a schematic front view of yet another example of the part of the separator according to the third modified example of Embodiment 1.

The air exits 153 are holes of a mesh 152, but are not limited thereto. For example, the air exits 153 may be slits extending in a circumferential direction of the second covering part 14, as shown in FIG. 18. For example, the air exits 153 may be through holes each of which has an opening shape of a rectangle, as shown in FIG. 19.

Figure 20:
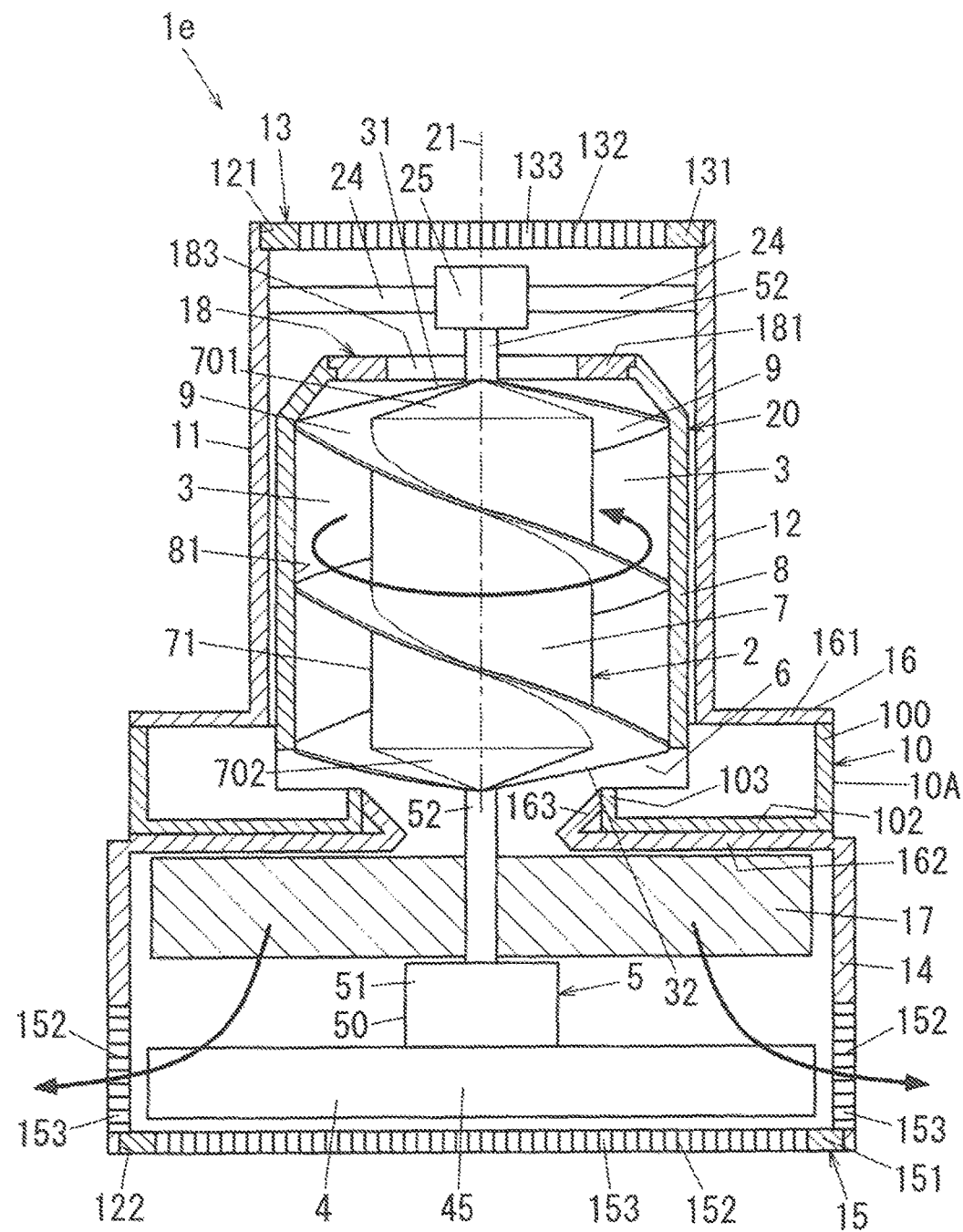
FIG. 20 is a schematic configuration diagram of a separator according to a fourth modified example of Embodiment 1.

FIG. 20 is a schematic configuration diagram of a separator 1e, serving as a fourth modified example of the separator 1a according to Embodiment 1.

The separator 1e differs from the separator 1d according to the third modified example in that a driving device 5 of the separator 1e is configured to rotate an axle 7 only and a frame body 8 is not rotated.

The separator 1e includes: the axle 7 including a first end 701 and a second end 702 in an axis direction thereof and disposed on a rotation axis 21; the frame body 8 with a hollow circular cylindrical shape disposed coaxially with the axle 7 so as to surround the axle 7; and partition boards 9 disposed between the axle 7 and the frame body 8 so as to be arranged at intervals along a circumferential direction of the axle 7. The axle 7 serves as a rotor 2. Each of the partition boards 9 is coupled with the axle 7 (coupled with the axle 7 only, and not coupled with the frame body 8). Each of the flow channels 3 is a space surrounded by two partition boards 9 which are two of the plurality of partition boards 9 and adjacent to each other in the circumferential direction of the axle 7, a side surface 71 of the axle 7, and an inner circumferential surface 81 of the frame body 8. When rotating the axle 7, the separator 1e exerts, to the gas in the flow channels 3, a force in a rotation direction around the rotation axis 21. The separator 1e thus can lead the gas introduced through respective inlets 31 into the flow channels 3 to respective outlets 32 of the flow channels 3 while helically swirling the gas around the rotation axis 21. The separator 1e can discharge the solid materials suspended in the gas from a discharger 6 with the centrifugal force acted on the solid materials. Examples of meaning of "each of the partition boards 9 is coupled with the axle 7" include not only a case where each of the partition boards 9 is a separate member from the axle 7 and fixed to the axle 7, but also a case where each of the partition boards 9 is formed integrally with the axle 7.

In the separator 1e, each of the partition boards 9 is coupled with the axle 7 only and is not fixed to the frame body 8. With this configuration of the separator 1e, the mass to be rotated by the driving device 5 is reduced, compared to a case where each of the partition boards 9 is coupled with both the axle 7 and the frame body 8, leading to reduction in the consumed energy. Preferably, each of the partition boards 9 is out of contact with the inner circumferential surface 81 of the frame body 8, but are not limited thereto. For example, each of the partition boards 9 may be made of rubber or provided at its top end with a roller(s), and be in contact with the inner circumferential surface 81 of the frame body 8. Preferably, a top end of each of the partition boards 9 is rounded. With this configuration of the separator 1e, a distance between each of the partition boards 9 and the frame body 8 can be as minimized as possible, while they are kept out of contact with each other.

Such a configuration where the driving device 5 rotates the axle 7 only according to the separator 1e may be applied to the any of the separators 1a, 1b, 1c, and 1d, for example.

Figure 21:
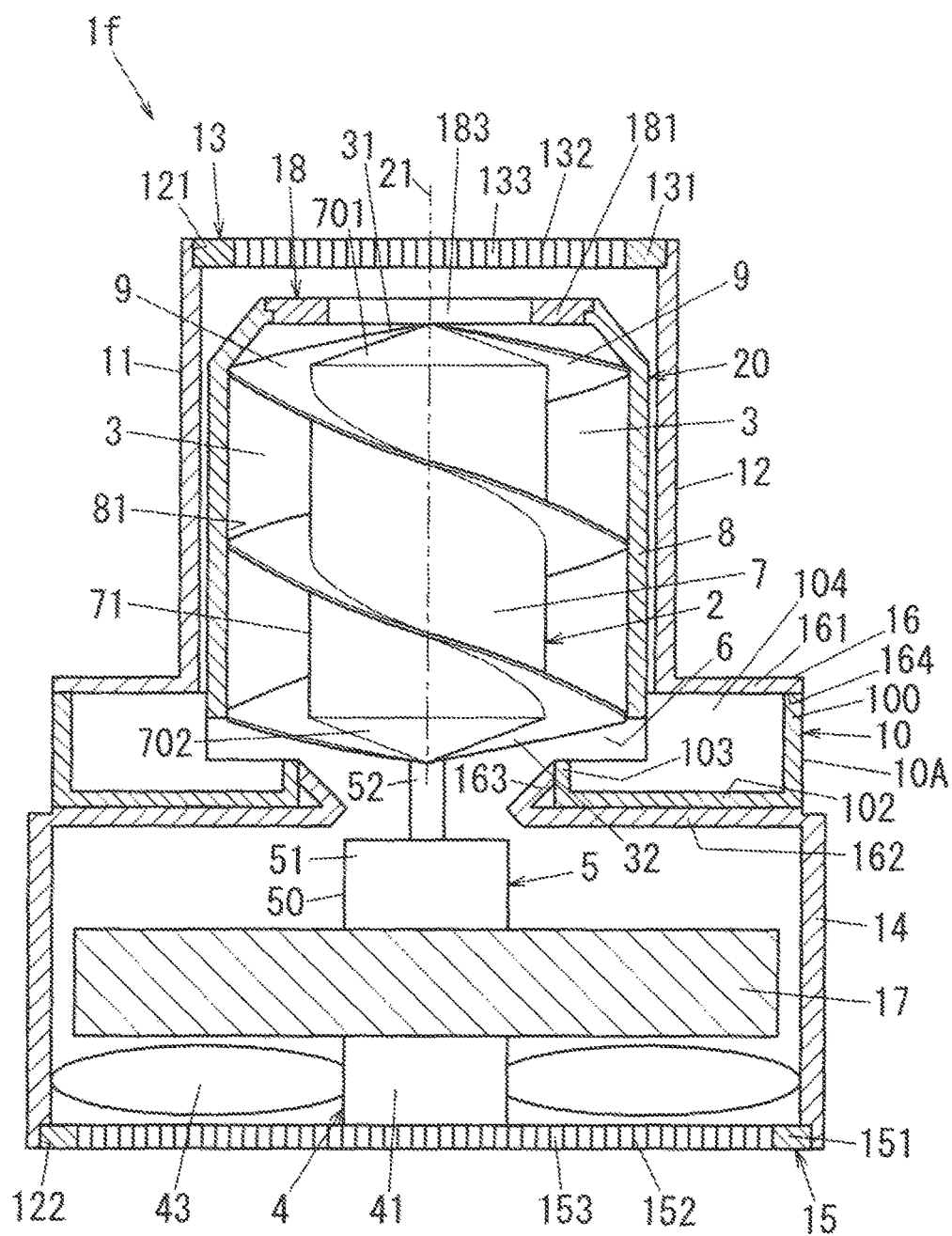
FIG. 21 is a schematic configuration diagram of a separator according to a fifth modified example of Embodiment 1.

FIG. 21 is a schematic configuration diagram of a separator 1f, serving as a fifth modified example of the separator 1a according to Embodiment 1.

The separator 1f differs from the separator 1a according to Embodiment 1 in that an air filter 17 is disposed between a driving device 5 and an air current producer 4.

Embodiment 2

Figure 22:
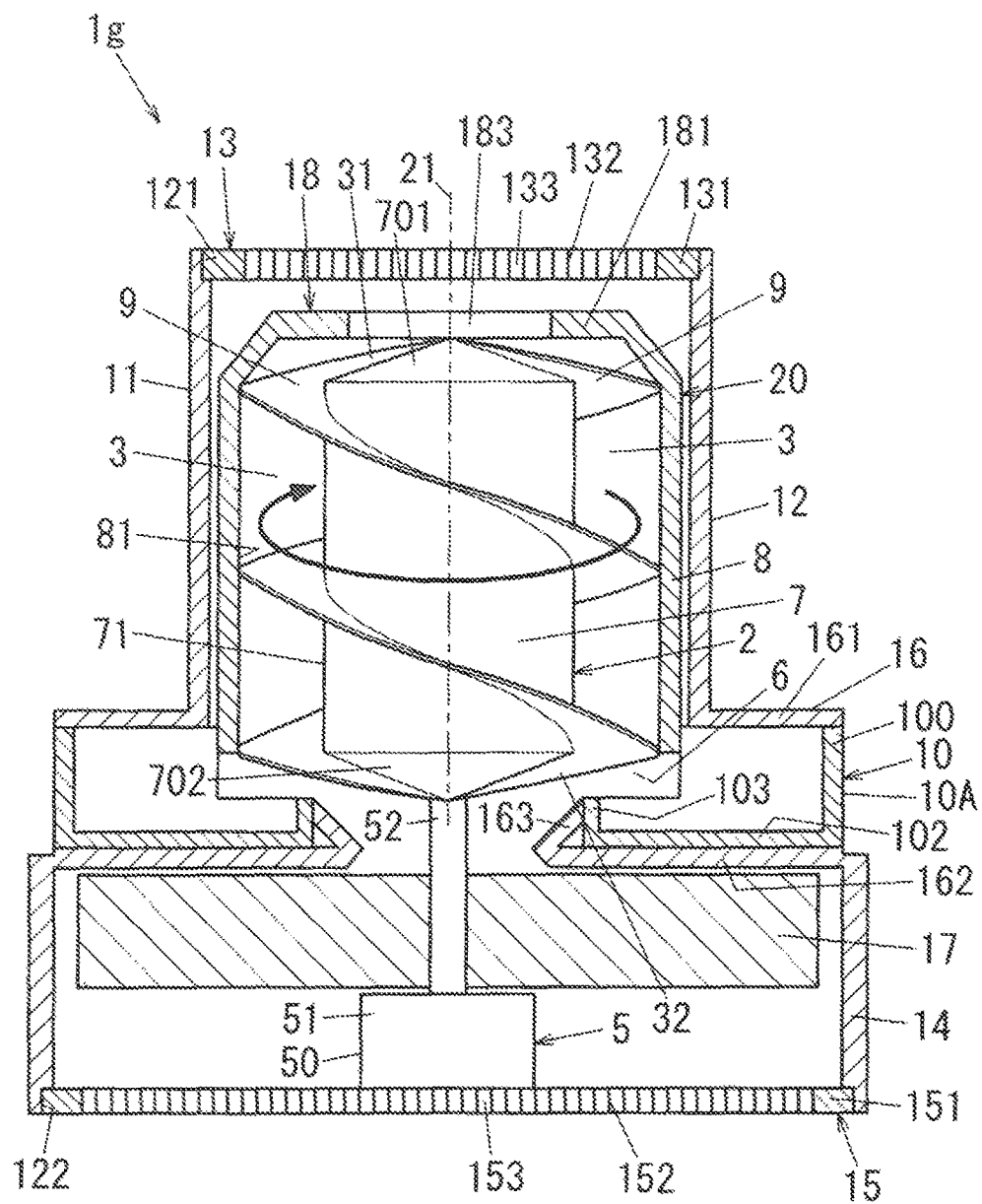
FIG. 22 is a schematic configuration diagram of a separator according to Embodiment 2.

Hereinafter, a separator 1g according to the present embodiment is described with reference to FIG. 22. For illustrating the separator 1g, like components as those of the separator 1a according to Embodiment 1 are designated by the same reference numerals and are not described again.

In the separator 1g, each of the flow channels 3 is helix. The separator 1g includes a driving device 5 configured to rotate a rotor 2 in a direction opposite to a helical direction of each of flow channels 3 as seen from the driving device 5. In the separator 1g, the flow channels 3 and the driving device 5 serve as an air current producer 4. The separator 1g with this configuration can omit the fan 41 included in the separator 1a as the air current produce 4, and thus can reduce the consumed energy and cost. A rotation direction of the rotor 2 is schematically shown in FIG. 22 with a bold arrow.

Embodiment 3

Figure 23:
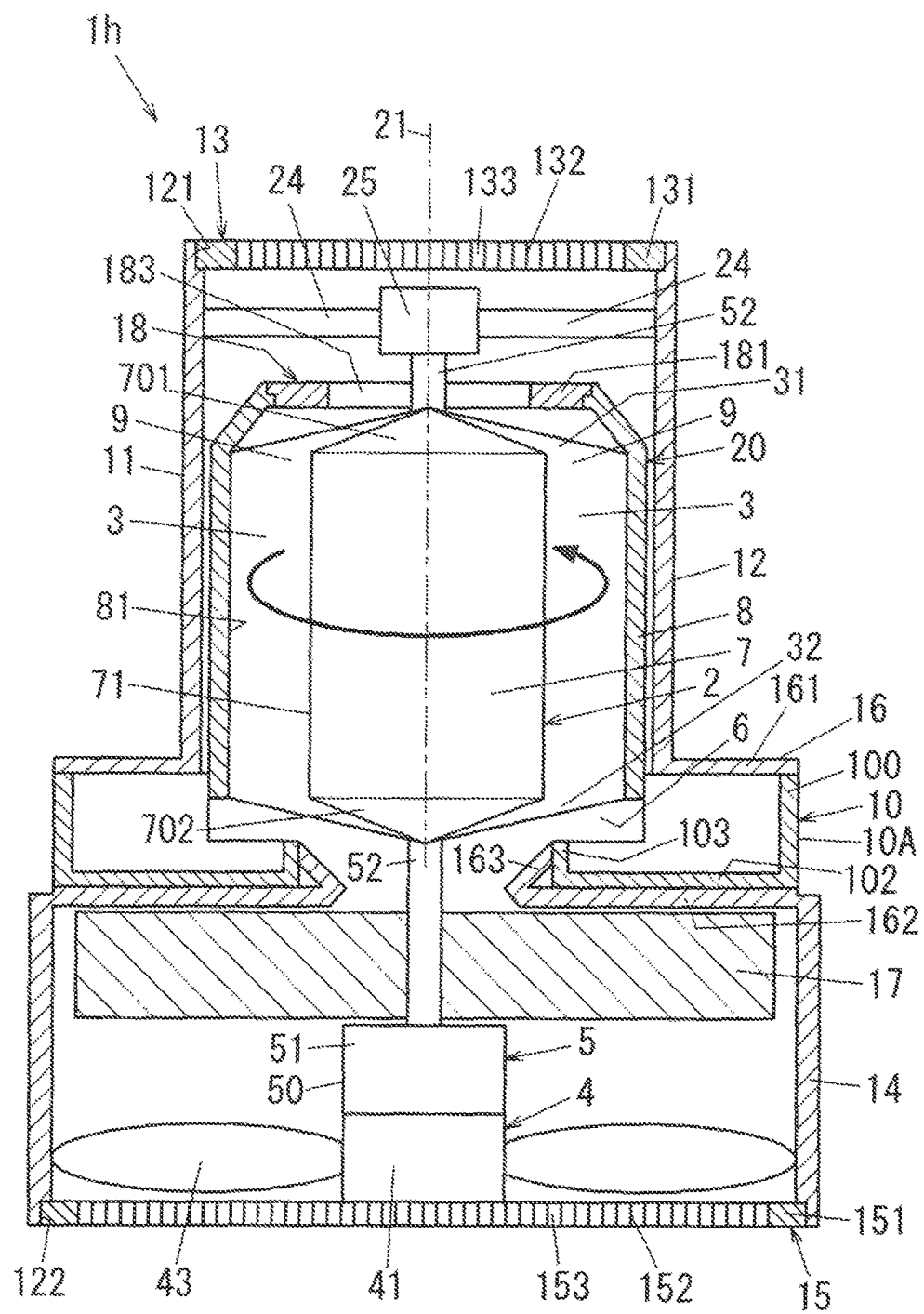
FIG. 23 is a schematic configuration diagram of a separator according to Embodiment 3.

Hereinafter, a separator 1h according to the present embodiment is described with reference to FIG. 23. For illustrating the separator 1h, like components as those of the separator 1a according to Embodiment 1 are designated by the same reference numerals and are not described again.

Similar to the separator 1b described above, the separator 1h includes a bearing 25 supported to a first covering part 12 by beams 24. The bearing 25 pivotally supports a rotation axle 52 protruding from an axle 7. The bearing 25 thus pivotally holds the rotation axle 52.

In the separator 1h, each of flow channels 3 extends along a rotation axis 21. With this configuration of the separator 1h, designing of the flow channels 3 is made easy compared to the separator 1a. The separator 1h is configured to rotate a rotor 2 to thereby rotate each of the flow channels 3. Accordingly, the gas flowing through each of the flow channels 3 has a velocity vector having a velocity component in a direction parallel to the rotation axis 21 and a velocity component in a rotation direction around the rotation axis 21. The separator 1h can efficiently separate the solid materials from the gas while having a compact size, compared to a conventional one which is configured not to rotate a flow channel.

In the separator 1h, preferably, partition boards 9 are arranged around the axle 7 at equal intervals. Each of the partition boards 9 has an elongated rectangular shape having a length axis in a direction along the rotation axis 21 and a width axis in a direction perpendicular to the rotation axis 21. Preferably, in the separator 1h, the partition boards 9 are arranged radially as seen in a direction along an axis of the axle 7. In short, each of the partition boards 9 extends from the axle 7 sideways in a radially outward direction of the axle 7.

Figure 24:
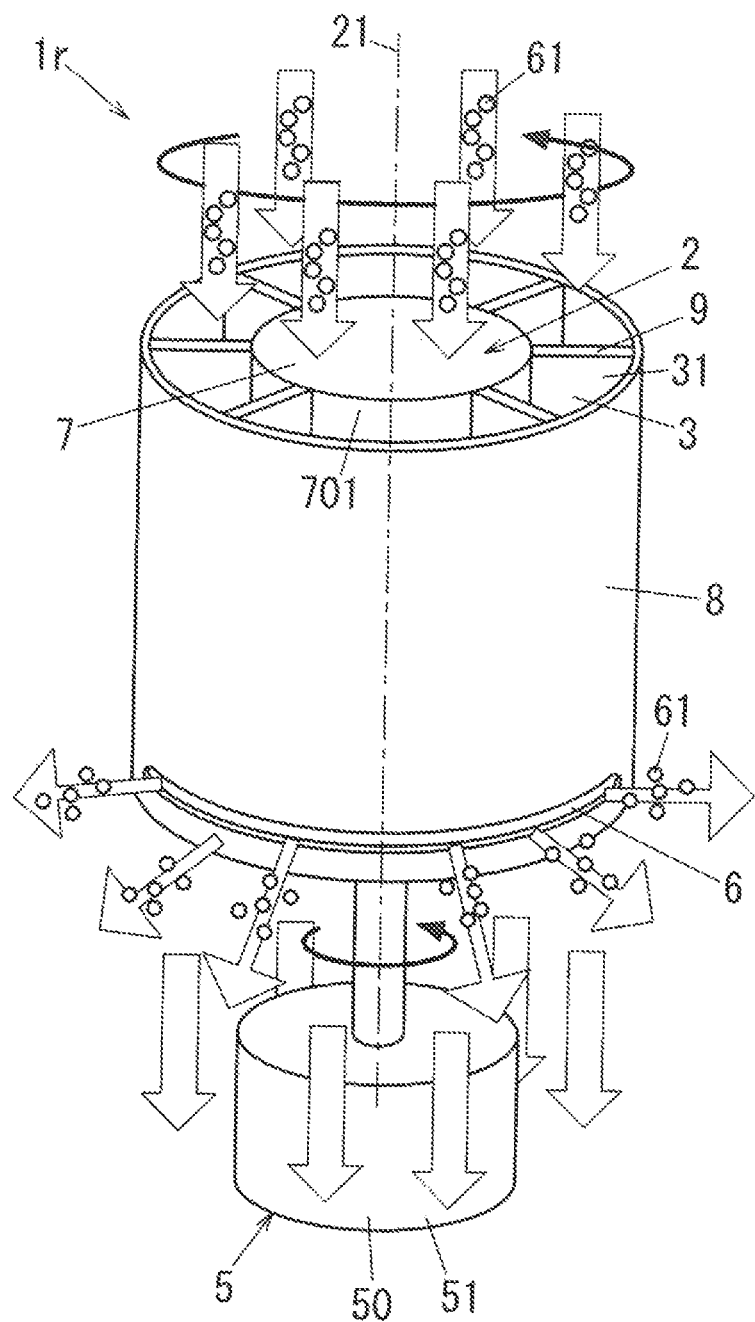
FIG. 24 is schematic perspective view of a part of a separator according to a first modified example of Embodiment 3.

As in a separator 1r shown in FIG. 24, serving as a first modified example of the separator 1h according to Embodiment 3, a discharger 6 may be formed in a frame body 8. In short, the discharger 6 may be formed directly in the frame body 8. The separator 1r with this configuration thus can have a higher degree of freedom in design of the shape, size, and the like of the discharger 6. For example, the discharger 6 may be a discharge port pierced in a downstream part of the frame body 8 in a radial direction of the frame body 8. In short, the discharger 6 is the discharge port directed to the direction perpendicular to a rotation axis 21 at a position closer to an outlet 32 than an inlet 31 of each of flow channels 3. A flow of gas is schematically shown in FIG. 24 with white arrows. Particles 61 are also schematically shown in FIG. 24. Such a configuration where the discharger 6 is formed in the frame body 8 may be applied to any other embodiments and the like.

Figure 25:
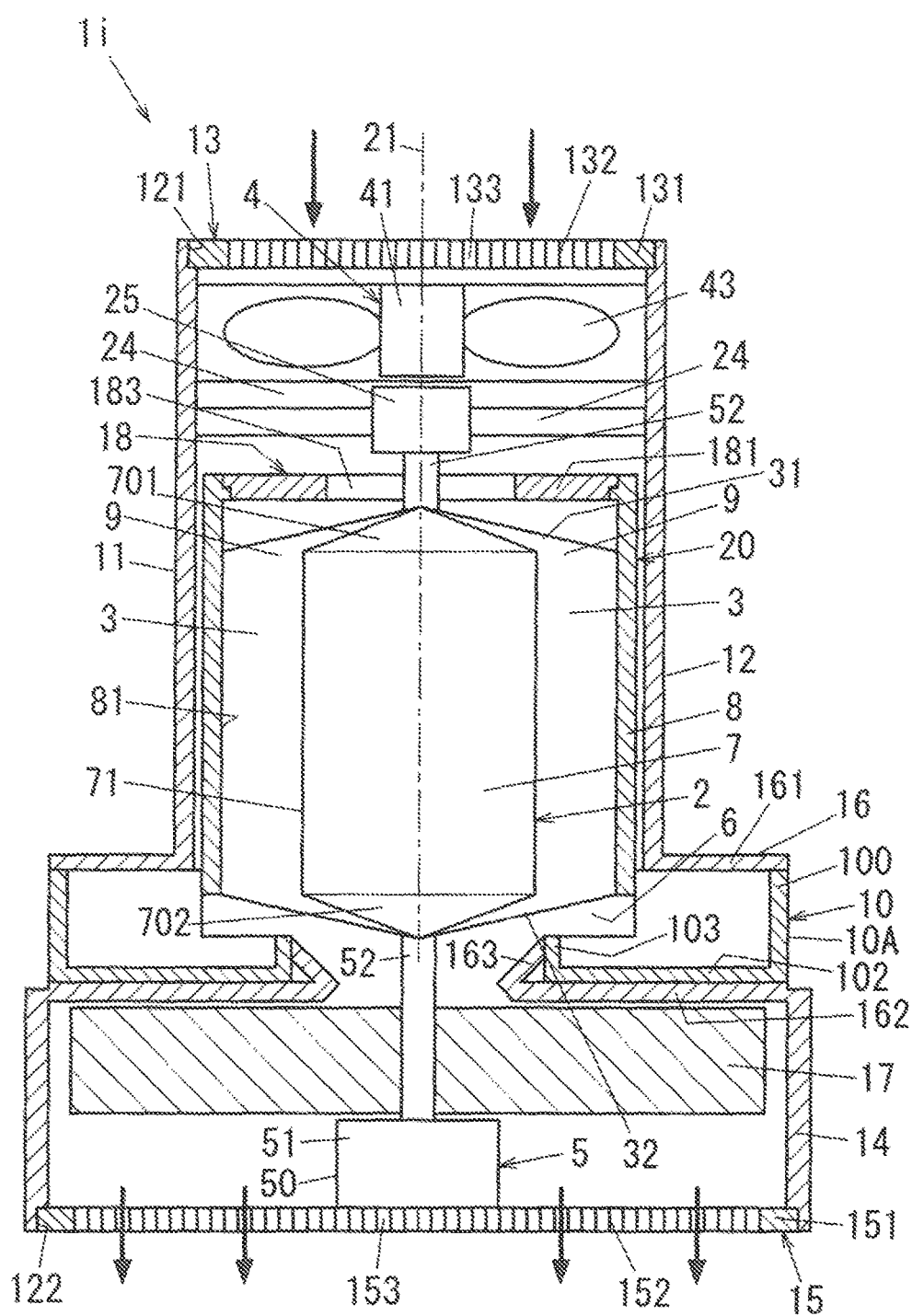
FIG. 25 is a schematic configuration diagram of a separator according to a second modified example of Embodiment 3.

A separator 1i, serving as a second modified example of the separator 1h according to Embodiment 3, will be described with reference to FIG. 25. Like components as those of the separator 1h according to Embodiment 3 are designated by the same reference numerals and are not described again.

The separator 1i differs from the separator 1h according to Embodiment 3 in that an air current producer 4 of the separator 1i is provided on an upstream of a cyclone separator 20, not in a downstream thereof. That is, the separator 1i differs from the separator 1h according to Embodiment 3 in including the current producer 4 provided on the upstream of flow channels 3. With this configuration, the separator 1i can efficiently introducing the gas from the outside of a casing 11 into the inside of the casing 11, compared to the separator 1h according to Embodiment 3. A flow of gas is schematically shown in FIG. 25 with bold arrows.

Figure 26:
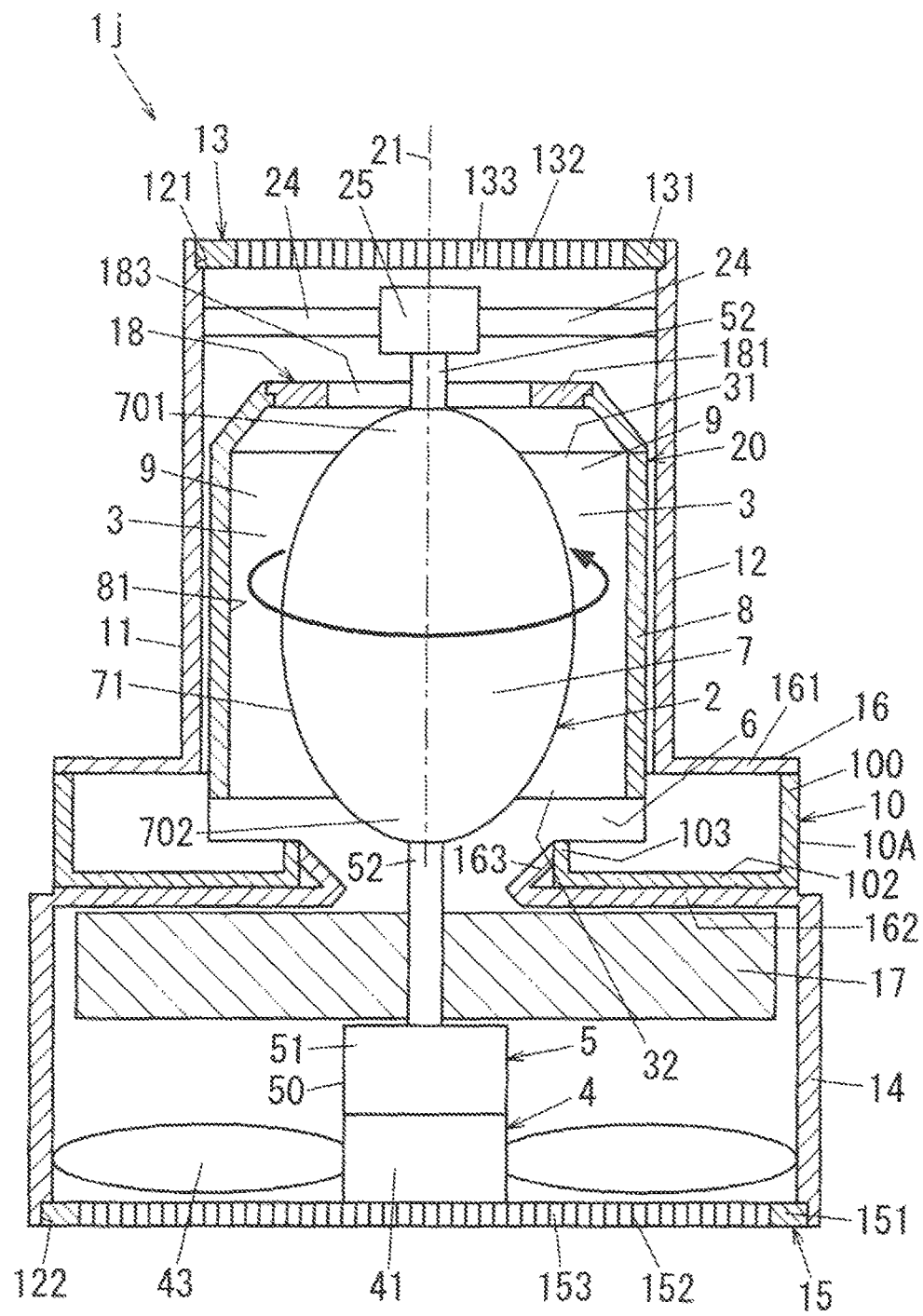
FIG. 26 is a schematic configuration diagram of a separator according to a third modified example of Embodiment 3.

A separator 1j, serving as a third modified example of the separator 1h according to Embodiment 3, will be described with reference to FIG. 26. For illustrating the separator 1j, like components as those of the separator 1h according to Embodiment 3 are designated by the same reference numerals and are not described again.

In the separator 1j, an axle 7 has an outline of a streamlined shape along a rotation axis 21. Specifically, the axle 7 has a shape of an oval sphere of which long axis accords with the rotation axis 21. The separator 1j can suppress turbulence generation in each of flow channels 3, compared to the separator 1h according to Embodiment 3.

Figure 27:
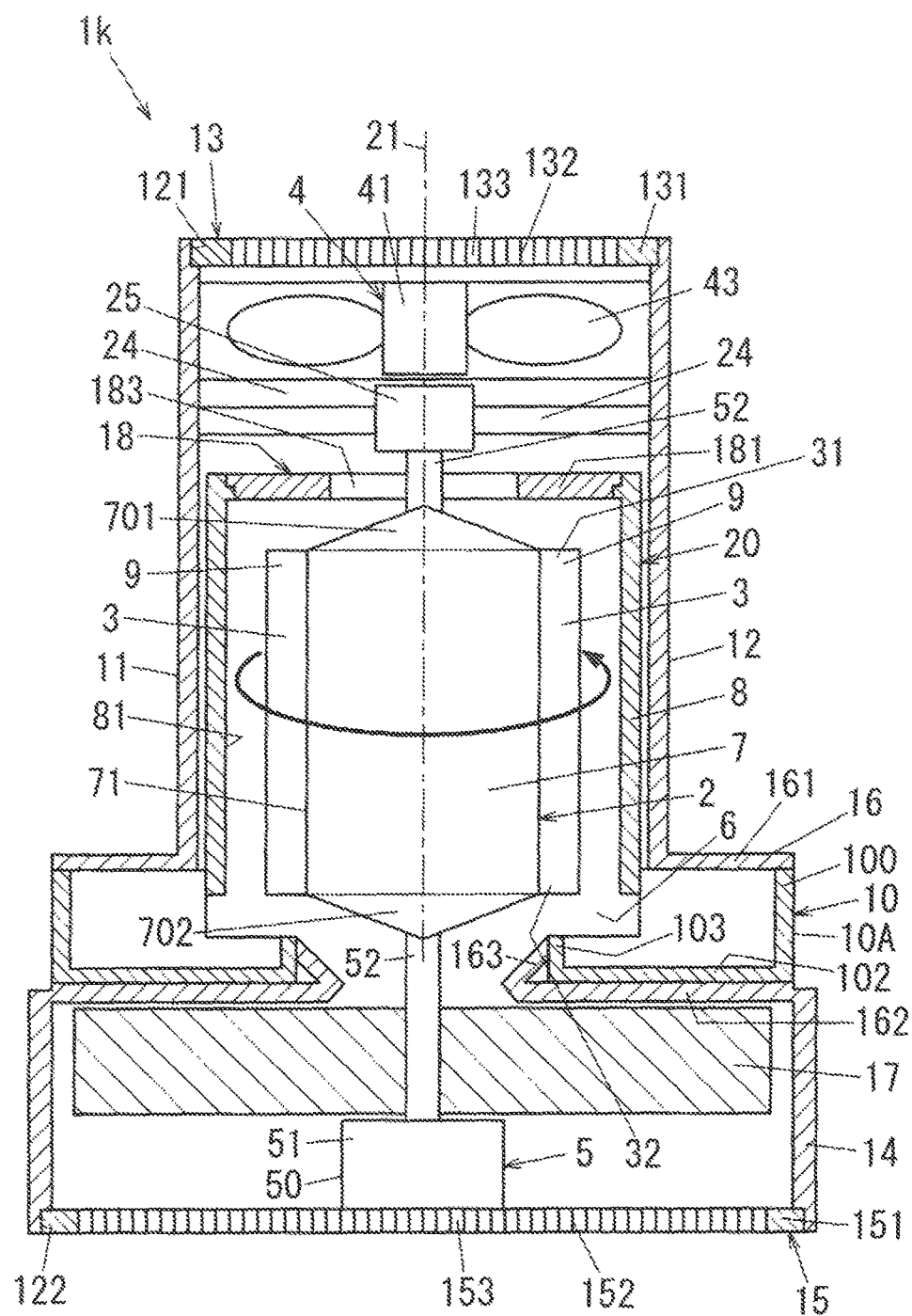
FIG. 27 is a schematic configuration diagram of a separator according to a fourth modified example of Embodiment 3.

A separator 1k, serving as a fourth modified example of the separator 1h according to Embodiment 3, will be described with reference to FIG. 27. For illustrating the separator 1k, like components as those of the separator 1i according to the second modified example are designated by the same reference numerals and are not described again.

The separator 1k differs from the separator 1i according to the second modified example in that a driving device 5 of the separator 1k is configured to rotate an axle 7 only and a frame body 8 is not rotated.

The separator 1k includes: the axle 7 including a first end 701 and a second end 702 in an axis direction thereof and disposed on a rotation axis 21; the frame body 8 with a hollow circular cylindrical shape disposed coaxially with the axle 7 so as to surround the axle 7; and partition boards 9 disposed between the axle 7 and the frame body 8 so as to be arranged at intervals along a circumferential direction of the axle 7. The axle 7 serves as the rotor 2. Each of the partition boards 9 is coupled with the axle 7 (coupled with the axle 7 only, and not coupled with the frame body 8). Each of flow channels 3 is a space surrounded by two partition boards 9 which are two of the plurality of partition boards 9 and adjacent to each other in the circumferential direction of the axle 7, a side surface 71 of the axle 7, and an inner circumferential surface 81 of the frame body 8. When rotating the axle 7, the separator 1k exerts, to the gas in the flow channels 3, a force in a rotation direction around the rotation axis 21. The separator 1k thus can lead the gas introduced through respective inlets 31 into the flow channels 3 to respective outlets 32 of the flow channels 3 while helically swirling the gas around the rotation axis 21. The separator 1k can discharge the solid materials suspended in the gas from a discharger 6 with the centrifugal force acted on the solid materials.

In the separator 1k, each of the partition boards 9 is coupled with the axle 7 only and is not fixed to the frame body 8. With this configuration of the separator 1k, the mass of load to be rotated by the driving device 5 is reduced, compared to a case where each of the partition boards 9 is coupled with both the axle 7 and the frame body 8, leading to reduction in the consumed energy.

Figure 28:
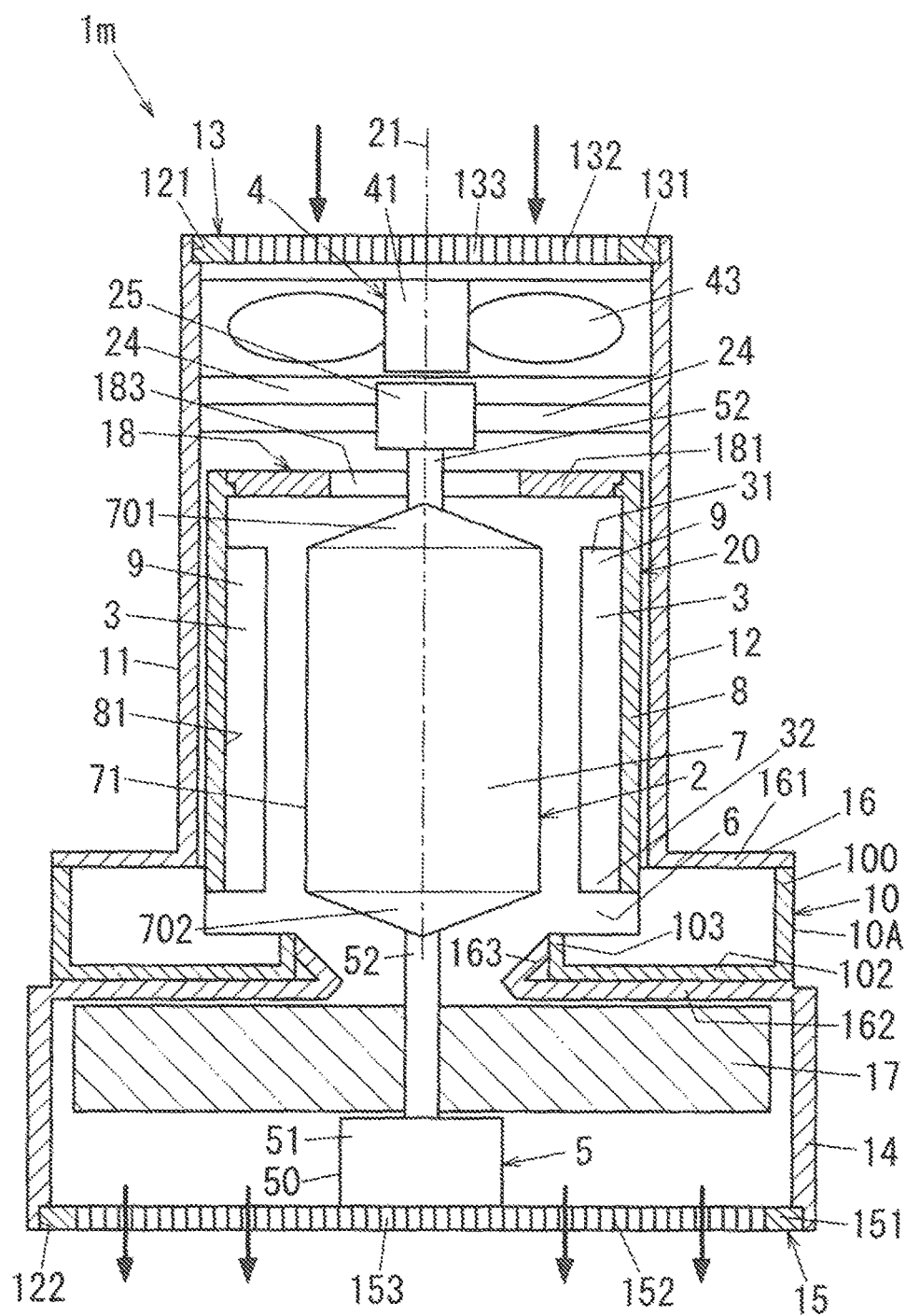
FIG. 28 is a schematic configuration diagram of a separator according to a fifth modified example of Embodiment 3.

A separator 1m, serving as a fifth modified example of the separator 1h according to Embodiment 3, will be described with reference to FIG. 28. For illustrating the separator 1m, like components as those of the separator 1i according to the second modified example are designated by the same reference numerals and are not described again.

The separator 1m includes: an axle 7 including first end 701 and a second end 702 in an axis direction thereof and disposed on a rotation axis 21; a frame body 8 with a hollow circular cylindrical shape disposed coaxially with the axle 7 so as to surround the axle 7; and partition boards 9 disposed between the axle 7 and the frame body 8 so as to be arranged at intervals along a circumferential direction of the axle 7. The frame body 8 serves as the rotor 2. Each of the partition boards 9 is coupled with the frame body 8. Each of flow channels 3 is a space surrounded by two partition boards 9 which are two of the plurality of partition boards 9 and adjacent to each other in the circumferential direction of the axle 7, a side surface 71 of the axle 7, and an inner circumferential surface 81 of the frame body 8. When rotating the axle 7 and the frame body 8, the separator 1m exerts, to the gas in the flow channels 3, a force in a rotation direction around the rotation axis 21. The separator 1m thus can lead the gas introduced through respective inlets 31 into the flow channels 3 to respective outlets 32 of the flow channels 3 while helically swirling the gas around the rotation axis 21. The separator 1m can discharge the solid materials suspended in the gas from a discharger 6 with the centrifugal force acted on the solid materials. Examples of meaning of "each of the partition boards 9 is coupled with the frame body 8" include not only a case where each of the partition boards 9 is a separate member from the frame body 8 and fixed to the frame body 8, but also a case where each of the partition boards 9 is formed integrally with the frame body 8.

Figure 29:
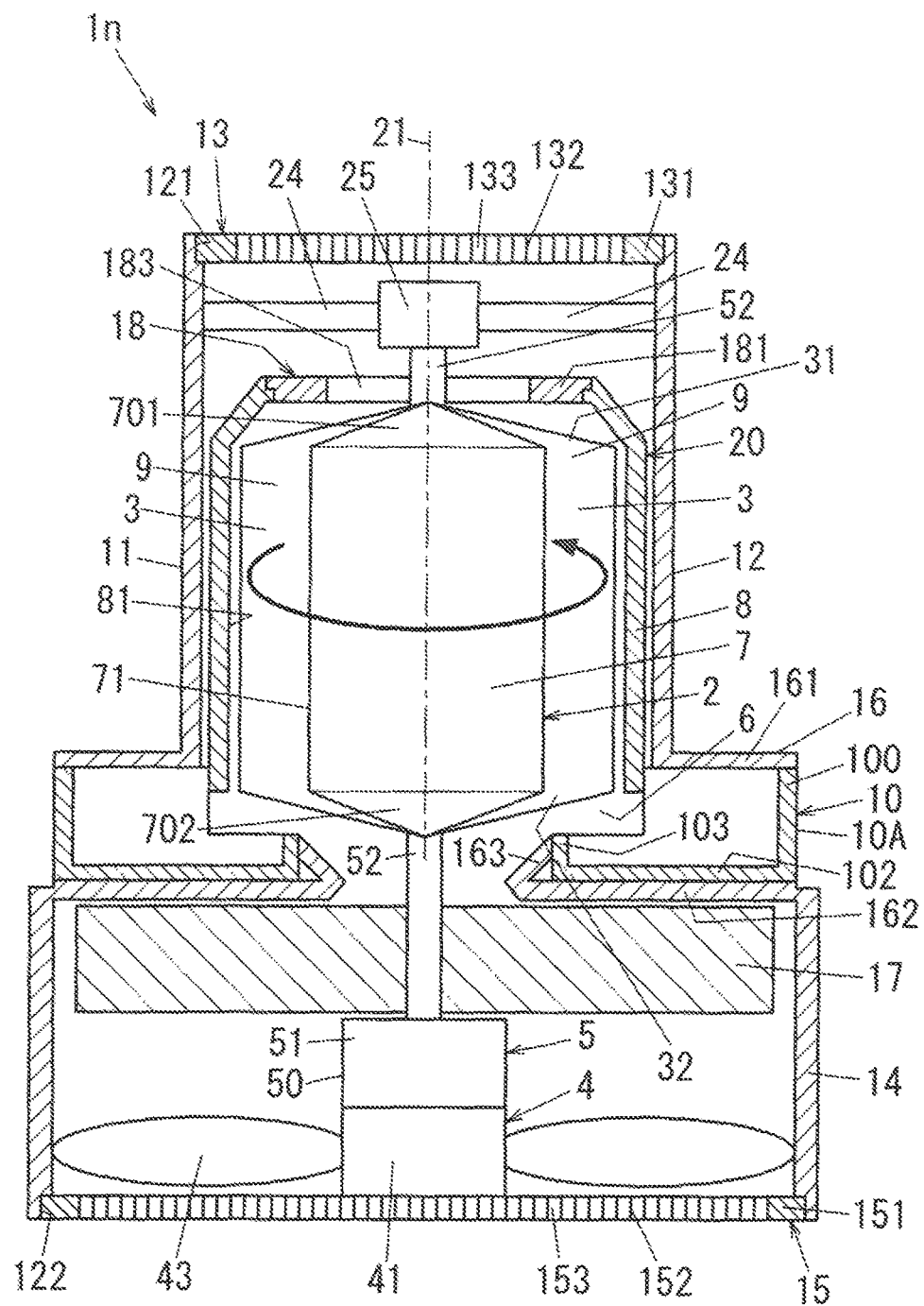
FIG. 29 is a schematic configuration diagram of a separator according to a sixth modified example of Embodiment 3.

A separator 1n, serving as a sixth modified example of the separator 1h according to Embodiment 3, will be described with reference to FIG. 29. For illustrating the separator 1n, like components as those of the separator 1h according to Embodiment 3 are designated by the same reference numerals and are not described again.

The separator 1n differs from the separator 1h according to Embodiment 3 in that a driving device 5 of the separator 1n is configured to rotate an axle 7 only and a frame body 8 is not rotated.

With this configuration of the separator 1n, the mass of load to be rotated by the driving device 5 is reduced, compared to a case where each of the partition boards 9 is fixed to the frame body 8, leading to reduction in the consumed energy.

Figure 30:
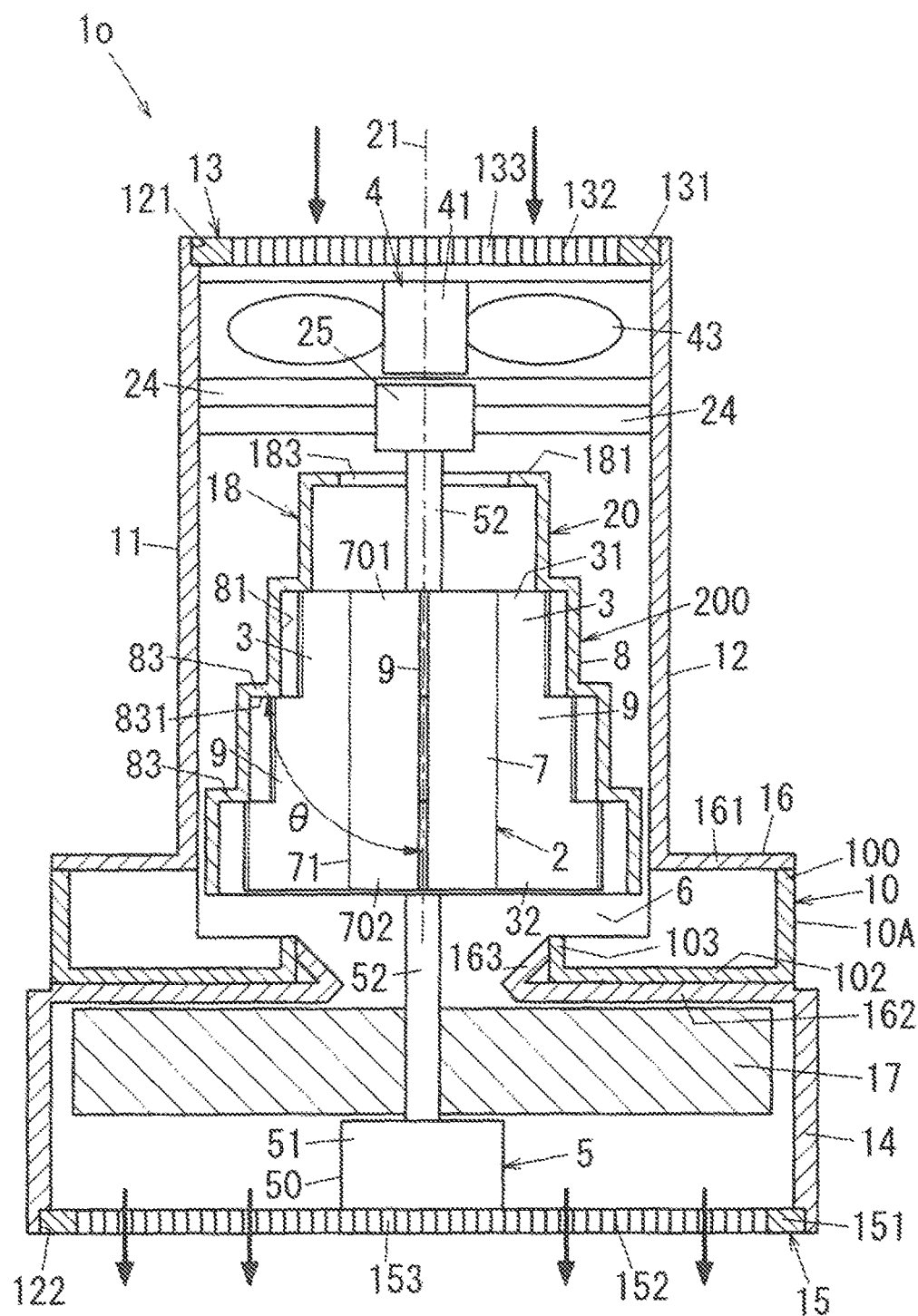
FIG. 30 is a schematic configuration diagram of a separator according to a seventh modified example of Embodiment 3.
Figure 31A:
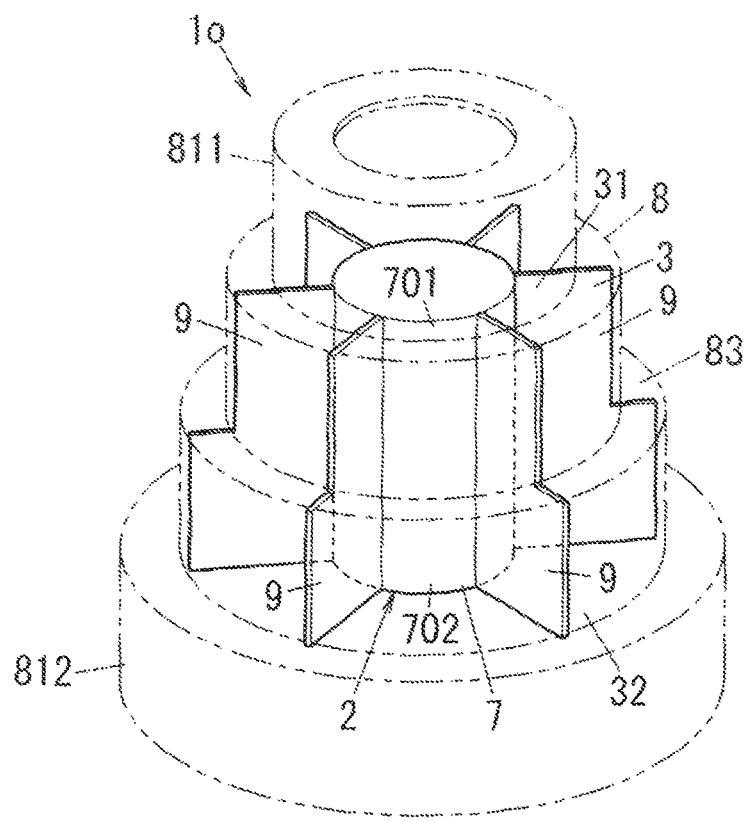
FIG. 31A is a perspective view of a part of the separator according to the seventh modified example of Embodiment 3.
Figure 31B:
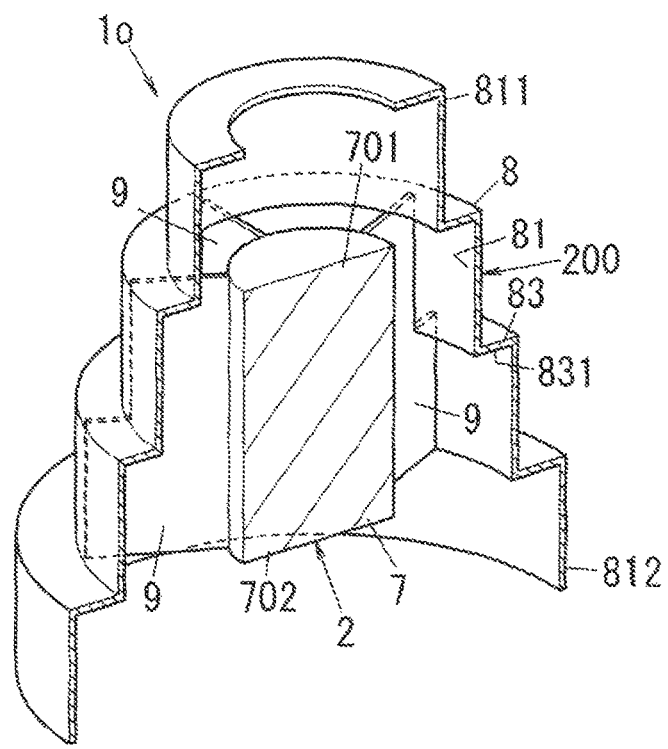
FIG. 31B is a sectional perspective view of the part of the separator according to the seventh modified example of Embodiment 3.

A separator 1o, serving as a seventh modified example of the separator 1h according to Embodiment 3, will be described with reference to FIGS. 30 and 31. For illustrating the separator 1o, like components as those of the separator 1i according to the second modified example are designated by the same reference numerals and are not described again.

The separator 1o includes a frame body 8 disposed coaxially with a rotor 2 so as to surround the rotor 2. Flow channels 3 are between the rotor 2 and the frame body 8. The frame body 8 has a first end 811 closer to an inlet 31 for gas of each of flow channels 3 and a second end 812 closer to an outlet 32 for gas thereof, in a direction along a rotation axis 21. The frame body 8 has, between the first end 811 and the second end 812, an expanding part 83 for increasing a distance between the frame body 8 and the rotor 2. With this configuration of the separator 1o, flow separation occurs in the fluid flowing through each of the flow channels 3 at the expanding part 83, to thereby cause particles suspended in vortex occurred by the flow separation to lose their energy. Accordingly, with the separator 1o, it is possible to suppress occurrence of bounce of the particles, which traveled towards the inner circumferential surface 81 of the frame body 8 with the centrifugal force acted thereon, from the inner circumferential surface 81. Accordingly, the separator 1o with this configuration can increase the gas velocity, the number of rotations, and the like, while suppressing the bounce of the particles from the inner circumferential surface 81 of the frame body 8. It is possible to improve the particle separation performance. The frame body 8 includes two or more hollow circular cylinders having different inner radii, which are arranged so that a hollow circular cylinder having a smaller inner radius is located closer to the first end 811 as well as a hollow circular cylinder having a larger inner radius is located closer to the second end 812, and includes two or more connection parts each of which connects two adjacent hollow circular cylinders arranged in a direction along the rotation axis 21. At least one connection part which is at least one of the two or more connection parts and located lateral to the axle 7 serves as the expanding part 83.

In the separator 1o, the expanding part 83 has an inner wall surface 831 defined as part of the inner circumferential surface 81 of the frame body 8. In the separator 1o, preferably, an angle θ between the inner wall surface 831 of the expanding part 83 and the rotation axis 21 is equal to or more than 90° and less than 180°. With this configuration of the separator 1o, a cross-sectional area of each of the flow channels 3 varies drastically between the upstream and the downstream of the expanding part 83. The "angle θ between the inner wall surface 831 of the expanding part 83 and the rotation axis 21" may be half of a spread angle of the frame body 8. In the separator 1o, the angle θ between the inner wall surface 831 of the expanding part 83 and the rotation axis 21 is 90°, for example. The "expanding part 83 for increasing the distance between the frame body 8 and the rotor 2" may include a shape in which the inner radius of a frame body 8 increases gradually, but it is preferable to have a shape where the angle θ between the inner wall surface 831 of the expanding part 83 and the rotation axis 21 is 90° or more and less than 180°. With this configuration of the separator 1o, it is possible to increase the possibility of occurrence of the flow separation in the fluid flowing through each of the flow channels 3 at the expanding part 83. It is accordingly possible to further suppress the occurrence of the bounce of particles, which traveled towards the inner circumferential surface 81 of the frame body 8 with the centrifugal force acted thereon, from the inner circumferential surface 81. Note that the shape in which the inner radius of a frame body 8 increases gradually means a shape in which an angle between the rotation axis 21 and a part of an inner wall surface of the frame body 8 of which inner radius increases gradually is less than 90°.

The separator 1o includes: an axle 7 including a first end 701 and a second end 702 in an axis direction thereof and disposed on a rotation axis 21; the frame body 8 with a hollow circular cylindrical shape disposed coaxially with the axle 7 so as to surround the axle 7; and partition boards 9 disposed between the axle 7 and the frame body 8 so as to be arranged at intervals along a circumferential direction of the axle 7. The axle 7 serves as the rotor 2. Each of the partition boards 9 is coupled with both the axle 7 and the frame body 8. Each of the flow channels 3 is a space surrounded by two partition boards 9 which are two of the plurality of partition boards 9 and adjacent to each other in the circumferential direction of the axle 7, a side surface 71 of the axle 7, and an inner circumferential surface 81 of the frame body 8.

A cyclone separator 20 includes, at a position on an upstream of the expanding part 83, a basic structure part 200 having a same structure as the second structural model of the cyclone. A part, corresponding to the basic structure part 200, of the frame body 8 has a hollow circular cylindrical shape. A part, corresponding to the basic structure part 200, of the axle 7 serving as the rotor 2 has a circular cylindrical shape. Preferably, a length of a part, corresponding to the basic structure part 200, of a flow channel 3 among a whole length thereof in a direction along the rotation axis 21, is equal to or less than a predefined length defined by following eq.(6). In other words, the expanding part 83 is preferably provided so that a length of a region having a constant distance between the frame body 8 and the rotor 2 is equal to or less than the predefined length. The predefined length may be a length along the rotation axis 21 of a flow channel 3 necessary for particles near the side surface 71 of the axle 7 to reach the inner circumferential surface 81 of the frame body 8 by the centrifugal force acted thereon.

$$L1 = K_2^2 \cdot \frac{18uBv_p}{D_{min}^2 R(\rho_s - \rho_f)\omega^2} \quad \text{eq. (6)}$$

In the eq.(6), "L1" [m] denotes the predefined length. "$D_{min}$" denotes the critical particle diameter, theoretically collected with 100% efficiency. "u" [Pa·s] denotes the viscosity coefficient of fluid. "B" [m] denotes the width of a flow channel 3. "$v_p$" [m/sec] denotes the velocity component, in a direction parallel to the axis of the axle 7, of velocity vector of helically moving particle. "R" [m] denotes the distance from the axis of the axle 7 to a center of the flow channel 3, in a direction perpendicular to the axis of the axle 7. "B" may be an average value of the inner diameter of the hollow circular cylinders of the frame body 8 and the outer diameter of the axle 7, of the basic structure part 200, for example. "$\rho_s$" [kg/m³] denotes the particle density. "$\rho f$" [kg/m³] denotes the fluid density. "$\omega$" [rad/s] denotes the angular velocity, in a rotational direction around the axis of the axle 7, of particle. "$K_2$" is the coefficient and preferably is a value of about 0.5 to 1.5. The value of "$K_2$" may vary according to a shape or the like of the separator 1o. The value of "$K_2$" may be determined according to experimental result and the like of particle separation performance of the separator 1o. Preferably, the number of rotations of the rotor 2 is set to a value around 1000 to 2000 rpm.

Preferably, the separator 1o includes two or more the expanding parts 83 arranged in a direction along the rotation axis 21. With this configuration of the separator 1o, it is possible to further suppress the occurrence of the bounce of particles with the centrifugal force acted thereon from the inner circumferential surface 81 of the frame body 8. It is possible to improve the particle separation performance.

The separator 1o includes a box-shaped container 10A for storing the solid materials discharged from the discharger 6. The container 10A includes an inner wall 103 and an outer wall 100 having different distances from the rotation axis 21. In the separator 1o, a distance between the rotation axis 21 and the inner wall 103 is longer than a distance between the rotation axis 21 and a side surface of the rotor 2, and a distance between the rotation axis 21 and the outer wall 100 is longer than a distance between the rotation axis 21 and the frame body 8. At least one of the two or more expanding parts 83 is overlapped with the container 10A in the direction along the rotation axis 21. With this configuration of the separator 1o, it is possible to suppress occurrence of bounce of the particles from the container 10A. Hence, it is possible to improve the particle separation performance.

Figure 32:
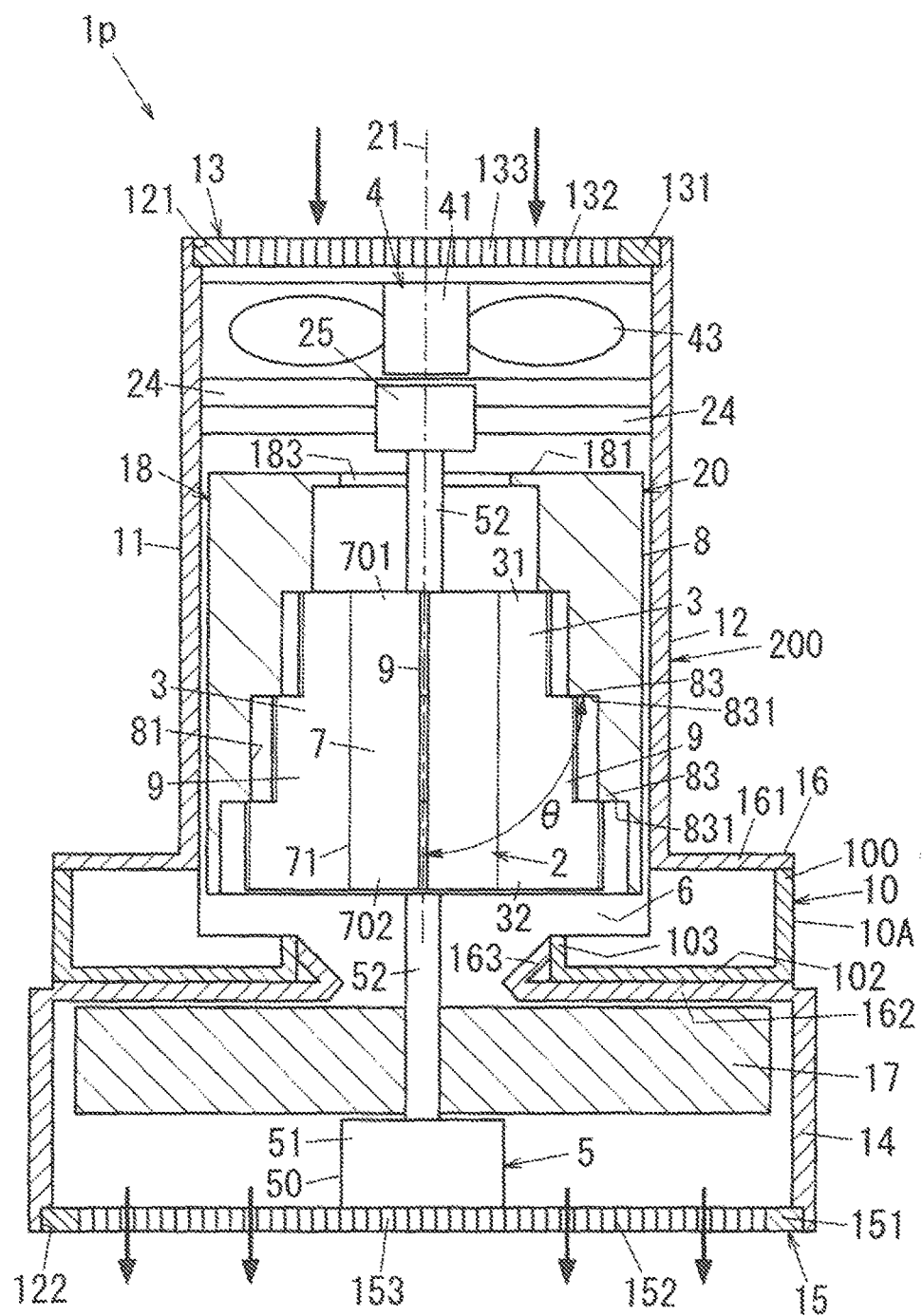
FIG. 32 is a schematic configuration diagram of a separator according to an eighth modified example of Embodiment 3.

A separator 1p, serving as an eighth modified example of the separator 1h according to Embodiment 3, will be described with reference to FIG. 32. For illustrating the separator 1p, like components as those of the separator 1o according to the seventh modified example are designated by the same reference numerals and are not described again.

The frame body 8 of the separator 1o has a substantially constant thickness as described above, but a frame body 8 of the separator 1p has a thickness that changes in a stepwise fashion in a direction along a rotation axis 21. The frame body 8 has the thickness in a direction perpendicular to the rotation axis 21, and the thickness decreases from a first end 811 to a second end 812 in a stepwise fashion. With this configuration of the separator 1p, the frame body 8 has an expanding part 83 for drastically increasing a distance between the frame body 8 and the rotor 2 between the first end 811 and the second end 812. With the separator 1p, similar to the separator 1o, flow separation occurs in the fluid flowing through each of the flow channels 3 at the expanding part 83. It is accordingly possible to suppress occurrence of bounce of the particles, which traveled towards the inner circumferential surface 81 of the frame body 8 with the centrifugal force acted thereon, from the inner circumferential surface 81. Accordingly, the separator 1p with this configuration can increase the gas velocity, the number of rotations, and the like, while suppressing the bounce of the particles from the inner circumferential surface 81 of the frame body 8. It is possible to improve the particle separation performance.

Figure 33A:
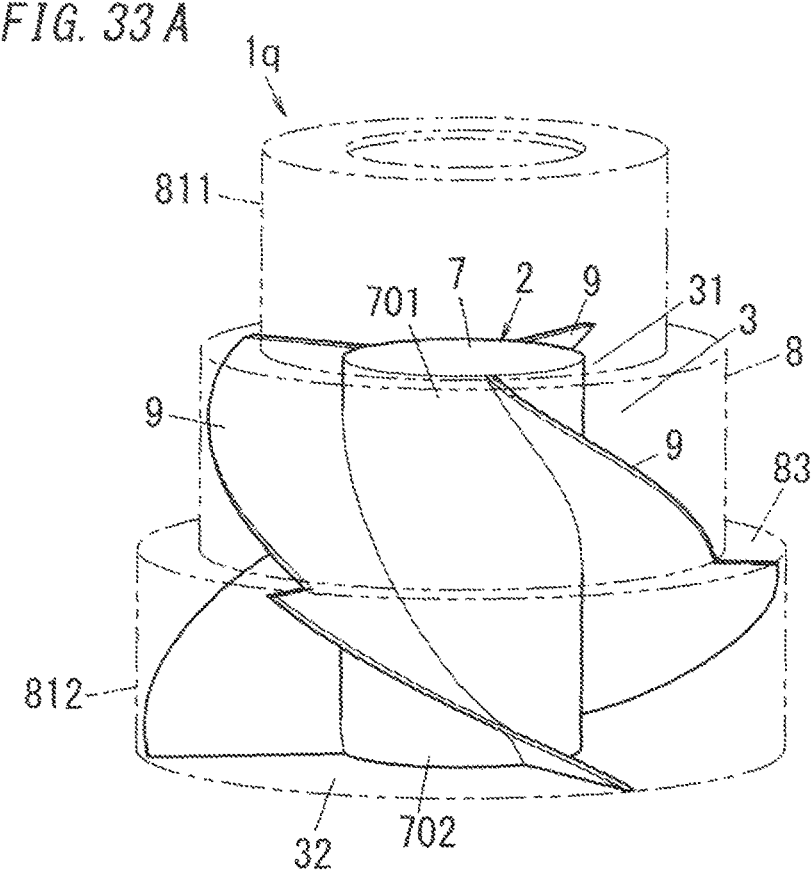
FIG. 33A is a perspective view of a part of a separator according to a ninth modified example of Embodiment 3.
Figure 33B:
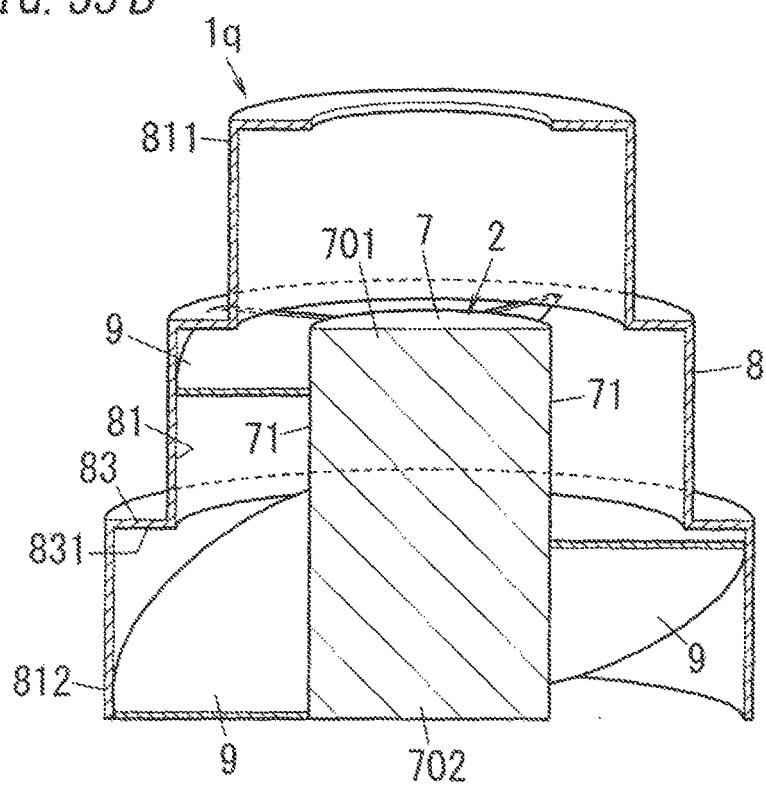
FIG. 33B is a perspective sectional view of the part of the separator according to the ninth modified example of Embodiment 3.

A separator 1q, serving as a ninth modified example of the separator 1h according to Embodiment 3, will be described with reference to FIG. 33. For illustrating the separator 1q, like components as those of the separator 1o according to the seventh modified example are designated by the same reference numerals and are not described again. The separator 1q differs from the separator 1o only in that partition boards 9 and flow channels 3 of the separator 1q have different shapes from shapes of the partition boards 9 and the flow channels 3 of the separator 1o. Accordingly, illustration and description of other components of the separator 1q is omitted.

Similar to the separator 1o, the separator 1q includes a frame body 8 disposed coaxially with a rotor 2 so as to surround the rotor 2, and the flow channels 3 are between the rotor 2 and a frame body 8. The frame body 8 has a first end 811 closer to an inlet 31 for gas of each of the flow channels 3 and a second end 812 closer to an outlet 32 for gas thereof, in a direction along a rotation axis 21. In the separator 1q, each of the partition boards 9 is formed in a helical shape. In the separator 1q, hence, each of the flow channels 3 is helix. The frame body 8 has, between the first end 811 and the second end 812, an expanding part 83 for drastically increasing a distance between the frame body 8 and the rotor 2. With this configuration of the separator 1q, similar to the separator 1o, flow separation occurs in the fluid flowing through each of the flow channels 3 at the expanding part 83, to thereby suppress occurrence of bounce of the particles, which traveled towards the inner circumferential surface 81 of the frame body 8 with the centrifugal force acted thereon, from the inner circumferential surface 81. Accordingly, the separator 1q with this configuration can increase the gas velocity, the number of rotations, and the like, while suppressing the bounce of the particles from the inner circumferential surface 81 of the frame body 8. It is possible to improve the particle separation performance.

The materials, values, and the like mentioned in the explanation of Embodiment 1 to 3 are preferable examples, and they are not used to limit the scope of the invention. Further, the embodiment embodying one aspect of the present invention may be modified in appropriate ways without depart from the scope of the technical concept of the present invention. For example, a separator may include tubes coupled with a rotor, where an inner space of each of the tubes serves as a flow channel. In this configuration, an axle, a rotation axle of a motor or the like may serve as a rotor. A separator is not limited to include flow channels, but may include at least one flow channel.

(Aspects of the Present Invention)

As is evident from the description provided above in Embodiments 1 to 3 and so on, a separator (1a, 1b, 1c, 1d, 1e, 1f, 1g, 1h, 1i, 1j, 1k, 1m, 1n, 1o, 1p, 1q, 1r) of a first aspect according to the present invention includes: a rotor (2); a plurality of flow channels (3) each of which has an inlet (31) and an outlet (32) for gas and are in a vicinity of a rotation axis (21) of the rotor (2); and an air current producer (4) configured to cause gas to flow through the plurality of flow channels (3), and further includes: a driving device (5) configured to rotate the rotor (2) to rotate the plurality of flow channels (3) around the rotation axis (21); and a discharger (6) for allowing discharge of solid materials suspended in airstream produced in each of the plurality of flow channels (3), in a direction away from the rotation axis (21).

A separator (1a, 1b, 1c, 1d, 1e, 1f, 1g, 1h, 1i, 1j, 1k, 1m, 1n, 1o, 1p, 1q, 1r) of a second aspect according to the present invention is realized in combination with the first aspect, and the discharger (6) is a discharge port directed to a direction perpendicular to the rotation axis (21) at a position nearer to the outlet (32) than the inlet (31) of each of the flow channels (3).

A separator (1a, 1b, 1c, 1d, 1e, 1f, 1g, 1h, 1i, 1j, 1k, 1m, 1n, 1o, 1p, 1q, 1r) of a third aspect according to the present invention is realized in combination with the first or second aspect, and further includes a collector (10) for collecting the solid materials discharged from the discharger (6).

A separator (1a, 1b, 1c, 1d, 1e, 1f, 1g, 1h, 1i, 1j, 1k, 1m, 1n, 1o, 1p, 1q, 1r) of a fourth aspect according to the present invention is realized in combination with any one of the first to third aspects, and the plurality of flow channels (3) are not overlapped with each other in the direction away from the rotation axis (21).

A separator (1a, 1b, 1c, 1d, 1e, 1f, 1g, 1h, 1i, 1j, 1r) of a fifth aspect according to the present invention is realized in combination with any one of the first to fourth aspects, and includes: an axle (7) including first and second ends (701, 702) in an axis direction thereof and disposed on the rotation axis (21); a frame body (8) with a hollow circular cylindrical shape disposed coaxially with the axle (7) so as to surround the axle (7); and a plurality of partition boards (9) disposed between the axle (7) and the frame body (8) so as to be arranged at intervals along a circumferential direction of the axle (7). The axle (7) serves as the rotor (2). The plurality of partition boards (9) each are coupled with both the axle (7) and the frame body (8). Each of the plurality of flow channels (3) is a space surrounded by: two partition boards (9) which are two of the plurality of partition boards (9) and adjacent to each other in the circumferential direction of the axle (7); a side surface (71) of the axle (7); and an inner circumferential surface (81) of the frame body (8).

A separator (1k, 1n) of a sixth aspect according to the present invention is realized in combination with any one of the first to fourth aspects, and includes: an axle (7) including first and second ends (701, 702) in an axis direction thereof and disposed on the rotation axis (21); a frame body (8) with a hollow circular cylindrical shape disposed coaxially with the axle (7) so as to surround the axle (7); and a plurality of partition boards (9) disposed between the axle (7) and the frame body (8) so as to be arranged at intervals along a circumferential direction of the axle (7). The axle (7) serves as the rotor (2). The plurality of partition boards (9) each are coupled with the axle (7). Each of the plurality of flow channels (3) is a space surrounded by: two partition boards (9) which are two of the plurality of partition boards (9) and adjacent to each other in the circumferential direction of the axle (7); a side surface (71) of the axle (7); and an inner circumferential surface (81) of the frame body (8).

A separator (1m) of a seventh aspect according to the present invention is realized in combination with any one of the first to fourth aspects, and includes: an axle (7) including first and second ends (701, 702) in an axis direction thereof and disposed on the rotation axis (21); a frame body (8) with a hollow circular cylindrical shape disposed coaxially with the axle (7) so as to surround the axle (7); and a plurality of partition boards (9) disposed between the axle (7) and the frame body (8) so as to be arranged at intervals along a circumferential direction of the axle (7). The frame body (8) serves as the rotor (2). The plurality of partition boards (9) each are coupled with the frame body (8). Each of the plurality of flow channels (3) is a space surrounded by: two partition boards (9) which are two of the plurality of partition boards (9) and adjacent to each other in the circumferential direction of the axle (7); a side surface (71) of the axle (7); and an inner circumferential surface (81) of the frame body (8).

A separator (1a, 1c, 1e, 1f, 1g, 1h, 1i, 1j, 1n) of an eighth aspect according to the present invention is realized in combination with any one of the fifth to seventh aspects, and each of the plurality of flow channels (3) includes a section connected to the inlet (31) a distance of which from the rotation axis (21) increases with an increase in a distance from the inlet (31).

A separator (1a, 1c, 1e, 1f, 1g, 1h, 1i, 1j, 1n) of a ninth aspect according to the present invention is realized in combination with any one of the fifth to eighth aspects, and further includes a cover part (18) for covering an upstream opening of the frame body (8). The cover part (18) has a vent (183). The axle (7) is tapered towards the vent (183) along the rotation axis at the first end (701) which is closer to the vent than the second end (702) is.

A separator (1a, 1c, 1d, 1e, 1f, 1g, 1h, 1i, 1j, 1k, 1m, 1n) of a tenth aspect according to the present invention is realized in combination with any one of the fifth to ninth aspects, and the axle (7) is tapered along the rotation axis (21) at the second end (702) which is closer to the outlet (32) of each of the plurality of flow channels (3) than the first end (701) is.

A separator (1a, 1b, 1c, 1d, 1e, 1f, 1g) of an eleventh aspect according to the present invention is realized in combination with any one of the fifth to tenth aspects, and each of the plurality of flow channels (3) extends from the inlet (31) to the outlet (32) in a direction between a rotation direction around the rotation axis (21) and a direction parallel to the rotation axis (21).

A separator (1a, 1b, 1c, 1d, 1e, 1f, 1g) of a twelfth aspect according to the present invention is realized in combination with the eleventh aspect, and each of the plurality of flow channels (3) is helix.

A separator (1h, 1i, 1j, 1k, 1m, 1n, 1r) of a thirteenth aspect according to the present invention is realized in combination with any one of the fifth to ninth aspects, and each of the plurality of flow channels (3) extends from the inlet (31) to the outlet (32) along the rotation axis (21).

A separator (1o, 1p, 1q) of a fourteenth aspect according to the present invention is realized in combination with the first aspect, and includes a frame body (8) disposed coaxially with the rotor (2) so as to surround the rotor (2). The plurality of flow channels (3) are between the rotor (2) and the frame body (8). The frame body (8) has a first end (811) closer to the inlet (31) for gas of each of the plurality of flow channels (3) and a second end (812) closer to the outlet (32) for gas thereof, in a direction along the rotation axis (21). The frame body (8) has, between the first end (811) and the second end (812), an expanding part (83) for increasing a distance between the frame body (8) and the rotor (2).

A separator (1o, 1p, 1q) of a fifteenth aspect according to the present invention is realized in combination with the fourteenth aspect, and the expanding part (83) has an inner wall surface (831) defined as part of an inner circumferential surface (81) of the frame body (8), and an angle (θ) between the inner wall surface (831) of the expanding part (83) and the rotation axis (21) is equal to or more than 90° and less than 180°.

A separator (1o, 1p, 1q) of a sixteenth aspect according to the present invention is realized in combination with the fourteenth or fifteenth aspect, and includes a plurality of the expanding parts (83). The plurality of expanding parts (83) are arranged in the direction along the rotation axis (21).

A separator (1o, 1p, 1q) of a seventeenth aspect according to the present invention is realized in combination with the sixteenth aspect, and further includes a box-shaped container (10A) for storing the solid materials discharged from the discharger (6). The container (10A) includes an inner wall (103) and an outer wall (100) having different distances from the rotation axis (21). A distance between the rotation axis (21) and the inner wall (103) is longer than a distance between the rotation axis (21) and a side surface of the rotor (2). A distance between the rotation axis (21) and the outer wall (100) is longer than a distance between the rotation axis (21) and the frame body (8). At least one of the plurality of expanding parts (83) is overlapped with the container (10A) in the direction along the rotation axis (21).

A separator (1a, 1b, 1c, 1d, 1e, 1f, 1h, 1i, 1j, 1k, 1m, 1n, 1o, 1p, 1q, 1r) of an eighteenth aspect according to the present invention is realized in combination with any one of the first to seventeenth aspects, and the air current producer (4) includes a fan (41) or a blower (45).

A separator (1g) of a nineteenth aspect according to the present invention is realized in combination with the twelfth aspect, and the driving device (5) is configured to rotate the rotor (2) in a direction opposite to a helical direction of each of the plurality of flow channels (3) as seen from the driving device (5), and the plurality of flow channels (3) and the driving device (5) serves as the air current producer (4).

A separator (1a, 1b, 1c, 1d, 1e, 1f, 1g, 1h, 1i, 1j, 1k, 1m, 1n, 1o, 1p, 1q) of a twentieth aspect according to the present invention is realized in combination with any one of the first to nineteenth aspects, and further includes a casing (11) enclosing the rotor (2), the plurality of flow channels (3), the air current producer (4) and the driving device (5). The discharger (6) is formed in the casing (11).

A separator (1r) of a twenty-first aspect according to the present invention is realized in combination with any one of the fifth to thirteenth and nineteenth aspects, and the discharger (6) is formed in the frame body (8).

The invention claimed is:

1. A separator, comprising:
   a rotor;
   a plurality of flow channels each of which has an inlet and an outlet for gas and are in a vicinity of a rotation axis of the rotor;
   an air current producer configured to cause gas to flow through the plurality of flow channels;
   a driving device configured to rotate the rotor to rotate the plurality of flow channels around the rotation axis;
   a discharger for allowing discharge of solid materials suspended in airstream produced in each of the plurality of flow channels, in a direction away from the rotation axis;
   a collector for collecting the solid materials discharged from the discharger;
   an axle including first and second ends in an axis direction thereof and disposed on the rotation axis;
   a frame body with a hollow circular cylindrical shape disposed coaxially with the axle so as to surround the axle; and
   a plurality of partition boards disposed between the axle and the frame body so as to be arranged at intervals along a circumferential direction of the axle,
   the axle serving as the rotor,
   each of the plurality of flow channels being a space surrounded by: two partition boards which are two of the plurality of partition boards and adjacent to each other in the circumferential direction of the axle; a side surface of the axle; and an inner circumferential surface of the frame body,
   wherein the axle is tapered at an upstream end.

2. The separator of claim 1, wherein the discharger allows discharge of the solid materials suspended in the airstream produced in each of the plurality of flow channels, in the direction away from the rotation axis, at a position nearer to the outlet than the inlet of each of the flow channels.

3. The separator of claim 1, wherein the plurality of flow channels are not overlapped with each other in the direction away from the rotation axis.

4. The separator of claim 1, wherein
   the plurality of partition boards each is coupled with both the axle and the frame body.

5. The separator of claim 1, wherein
   the plurality of partition boards each is coupled with the axle.

6. The separator of claim 1, wherein each of the plurality of flow channels includes a section connected to the inlet a distance of which from the rotation axis increases with an increase in a distance from the inlet.

7. The separator of claim 1, further comprising a cover part for covering an upstream opening of the frame body, the cover part having a vent,
the axle is tapered towards the vent along the rotation axis at the first end which is closer to the vent than the second end is.

8. The separator of claim 1, wherein the axle is tapered along the rotation axis at the second end which is closer to the outlet of each of the plurality of flow channels than the first end is.

9. The separator of claim 1, wherein each of the plurality of flow channels extends from the inlet to the outlet in a direction between a rotation direction around the rotation axis and a direction parallel to the rotation axis.

10. The separator of claim 9, wherein each of the plurality of flow channels is helix.

11. The separator of claim 1, wherein each of the plurality of flow channels extends from the inlet to the outlet along the rotation axis.

12. The separator of claim 1, wherein
the frame body has a first end closer to the inlet for gas of each of the plurality of flow channels and a second end closer to the outlet for gas thereof, in a direction along the rotation axis,
the frame body has, between the first end and the second end, an expanding part for increasing a distance between the frame body and the rotor.

13. The separator of claim 12, wherein
the expanding part has an inner wall surface defined as part of an inner circumferential surface of the frame body, and
an angle between the inner wall surface of the expanding part and the rotation axis is equal to or more than 90° and less than 180°.

14. The separator of claim 12, comprising a plurality of the expanding parts, the plurality of expanding parts being arranged in the direction along the rotation axis.

15. The separator of claim 14, further comprising a box-shaped container for storing the solid materials discharged from the discharger,
the container including an inner wall and an outer wall having different distances from the rotation axis,
a distance between the rotation axis and the inner wall being longer than a distance between the rotation axis and a side surface of the rotor,
a distance between the rotation axis and the outer wall being longer than a distance between the rotation axis and the frame body, and
at least one of the plurality of expanding parts being overlapped with the container in the direction along the rotation axis.

16. The separator of claim 1, wherein the air current producer includes a fan or a blower.

17. The separator of claim 10, wherein
the driving device is configured to rotate the rotor in a direction opposite to a helical direction of each of the plurality of flow channels as seen from the driving device, and
the plurality of flow channels and the driving device serves as the air current producer.

18. The separator of claim 1, further comprising a casing enclosing the rotor, the plurality of flow channels, the air current producer and the driving device,
the discharger being formed in the casing.

19. The separator of claim 1, wherein the discharger is formed in the frame body.

20. A separator, comprising:
a rotor;
a plurality of flow channels each of which has an inlet and an outlet for gas and are in a vicinity of a rotation axis of the rotor;
an air current producer configured to cause gas to flow through the plurality of flow channels;
a driving device configured to rotate the rotor to rotate the plurality of flow channels around the rotation axis;
a discharger for allowing discharge of solid materials suspended in airstream produced in each of the plurality of flow channels, in a direction away from the rotation axis;
a collector for collecting the solid materials discharged from the discharger,
an axle including first and second ends in an axis direction thereof and disposed on the rotation axis;
a frame body with a hollow circular cylindrical shape disposed coaxially with the axle so as to surround the axle; and
a plurality of partition boards disposed between the axle and the frame body so as to be arranged at intervals along a circumferential direction of the axle,
the axle serving as the rotor,
the plurality of partition boards each being coupled with the axle,
each of the plurality of flow channels being a space surrounded by: two partition boards which are two of the plurality of partition boards and adjacent to each other in the circumferential direction of the axle; a side surface of the axle; and an inner circumferential surface of the frame body.

* * * * *